United States Patent
Evans

(10) Patent No.: US 10,150,524 B2
(45) Date of Patent: Dec. 11, 2018

(54) INTELLIGENT POD MANAGEMENT AND TRANSPORT

(71) Applicant: Michael Steward Evans, San Jose, CA (US)

(72) Inventor: Michael Steward Evans, San Jose, CA (US)

(*) Notice: Subject to any disclaimer, the term of this patent is extended or adjusted under 35 U.S.C. 154(b) by 0 days.

(21) Appl. No.: 15/960,975

(22) Filed: Apr. 24, 2018

(65) Prior Publication Data

US 2018/0237086 A1    Aug. 23, 2018

Related U.S. Application Data

(63) Continuation-in-part of application No. 15/456,311, filed on Mar. 10, 2017.

(Continued)

(51) Int. Cl.

| | |
|---|---|
| *B62D 63/02* | (2006.01) |
| *B60L 11/18* | (2006.01) |
| *G05D 1/02* | (2006.01) |
| *G05D 1/00* | (2006.01) |
| *B60L 11/00* | (2006.01) |
| *B62D 31/02* | (2006.01) |
| *B60L 5/38* | (2006.01) |

(Continued)

(52) U.S. Cl.
CPC .............. *B62D 63/025* (2013.01); *B60F 5/02* (2013.01); *B60L 5/38* (2013.01); *B60L 11/005* (2013.01); *B60L 11/1816* (2013.01); *B60L 11/1838* (2013.01); *B60M 1/30* (2013.01); *B60P 3/423* (2013.01); *B62D 27/06* (2013.01); *B62D 31/025* (2013.01); *B64C 39/024* (2013.01); *G05D 1/0027* (2013.01); *G05D 1/0278* (2013.01); *H02J 7/0052* (2013.01); *B64C 2201/024* (2013.01); *B64C 2201/042* (2013.01); *B64C 2201/108* (2013.01); *B64C 2201/128* (2013.01); *B64C 2201/146* (2013.01)

(58) Field of Classification Search
CPC .. B62D 63/025; B62D 49/0642; B62D 12/00; B62D 12/02; G05D 1/0027
See application file for complete search history.

(56) References Cited

U.S. PATENT DOCUMENTS

| | | | |
|---|---|---|---|
| 2016/0031337 A1* | 2/2016 | Li | B60L 5/40 320/109 |
| 2018/0022405 A1* | 1/2018 | Gecchelin | B62D 47/006 |
| 2018/0126871 A1* | 5/2018 | Martinotti | B60L 15/36 |

* cited by examiner

*Primary Examiner* — Erez Gurari
(74) *Attorney, Agent, or Firm* — Donald R. Boys; Central Coast Patent Agency, LLC

(57) ABSTRACT

A transport system has a wheeled, steerable, self-powered, self-navigating carrier vehicle, having a substantially planar support frame, an on-board, rechargeable, battery-based power system, control circuitry, including GPS circuitry, on-board the carrier vehicle, adapted to drive and steer the carrier vehicle, and an upward-facing carrier interface adapted to the support frame, the carrier interface having first physical engagement elements, and a passenger pod adapted to carry both packages and persons, the passenger pod having a structural framework, a rechargeable, battery-based power system, and a downward-facing pod interface adapted to the structural framework, the carrier interface having second physical engagement elements. The passenger pod, placed upon the carrier vehicle, engages the downward-facing pod interface to the upward-facing carrier interface by the first and second physical engagement elements.

17 Claims, 26 Drawing Sheets

Related U.S. Application Data

(60) Provisional application No. 62/442,187, filed on Jan. 4, 2017.

(51) Int. Cl.
*B60M 1/30* (2006.01)
*B60F 5/02* (2006.01)
*B62D 27/06* (2006.01)
*B60P 3/42* (2006.01)
*H02J 7/00* (2006.01)
*B64C 39/02* (2006.01)

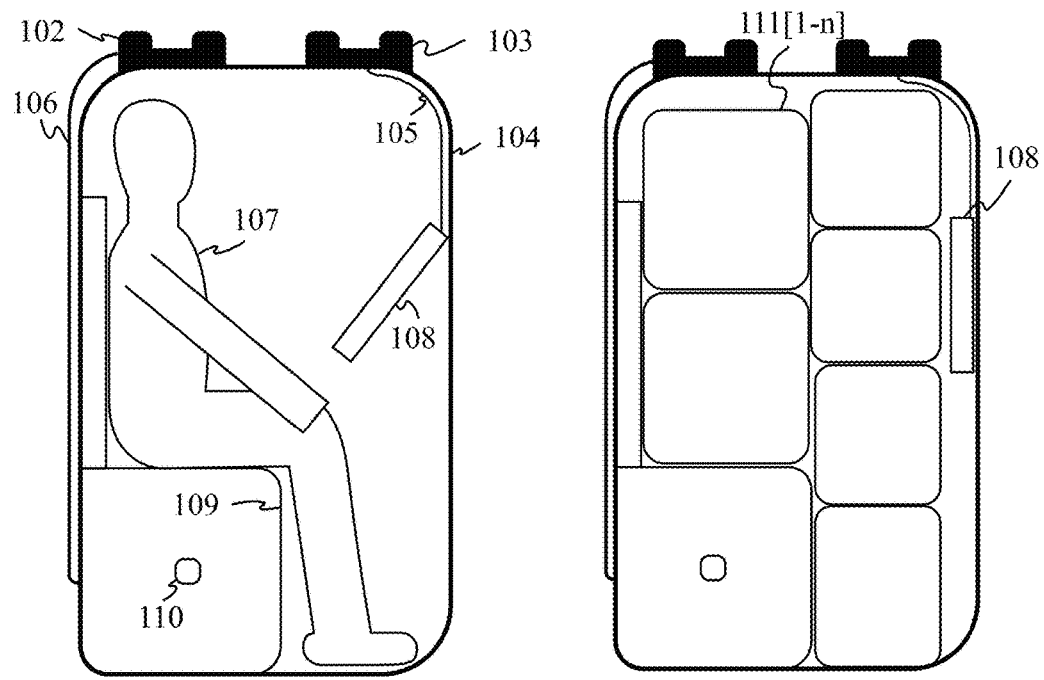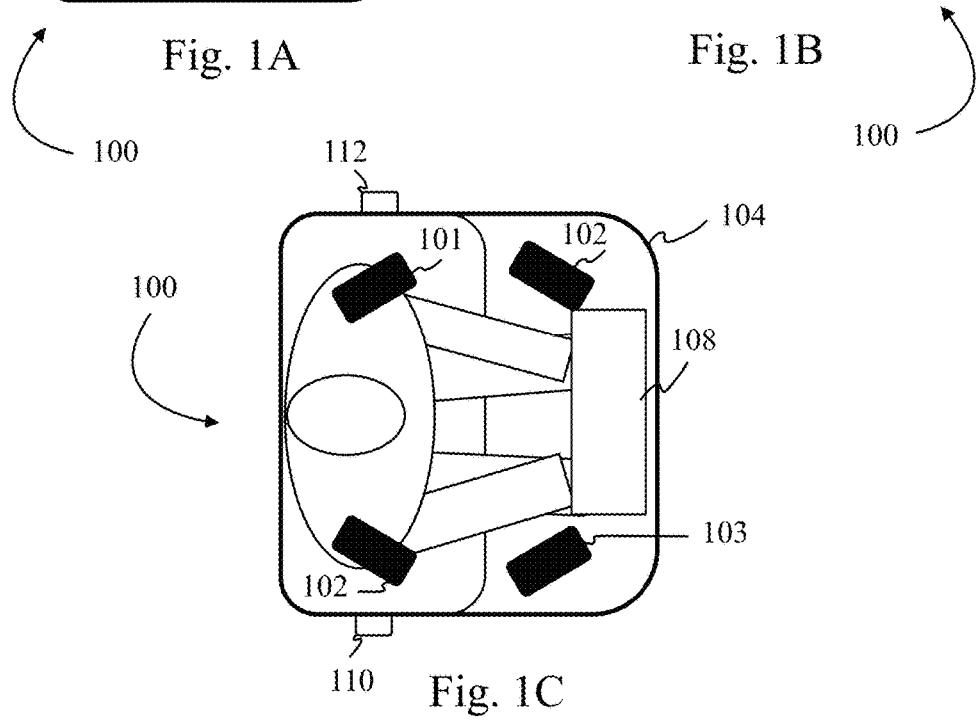

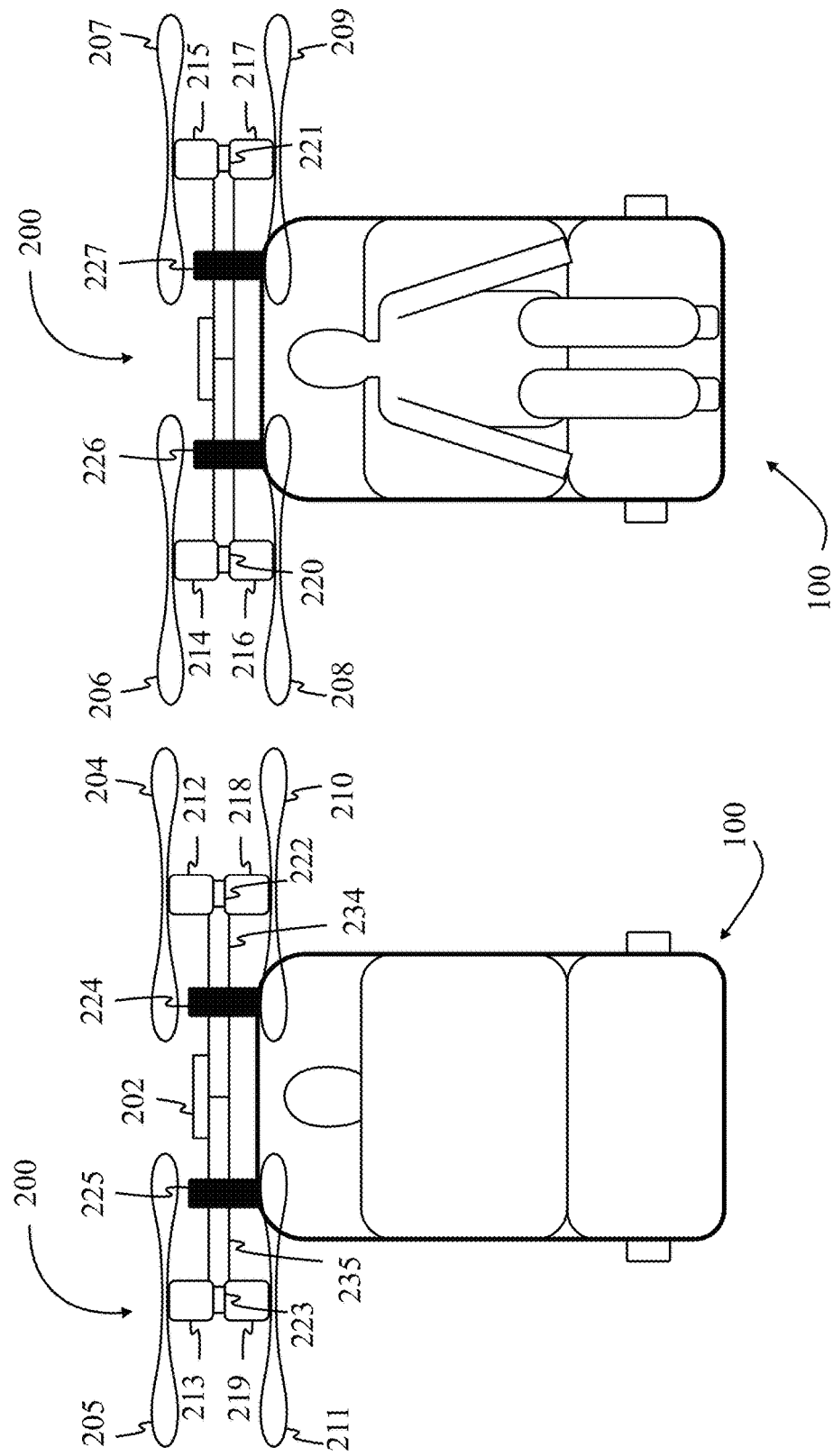

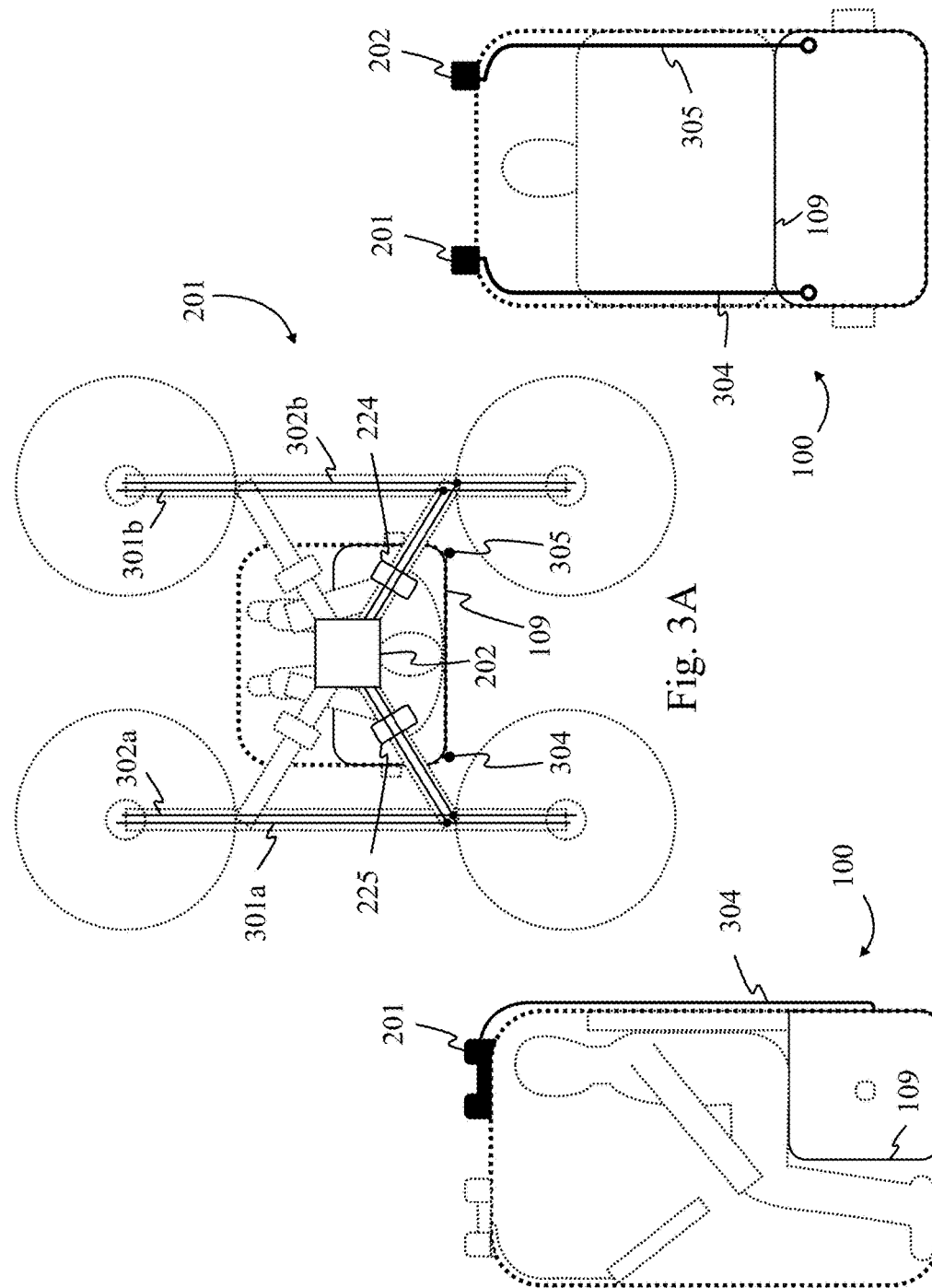

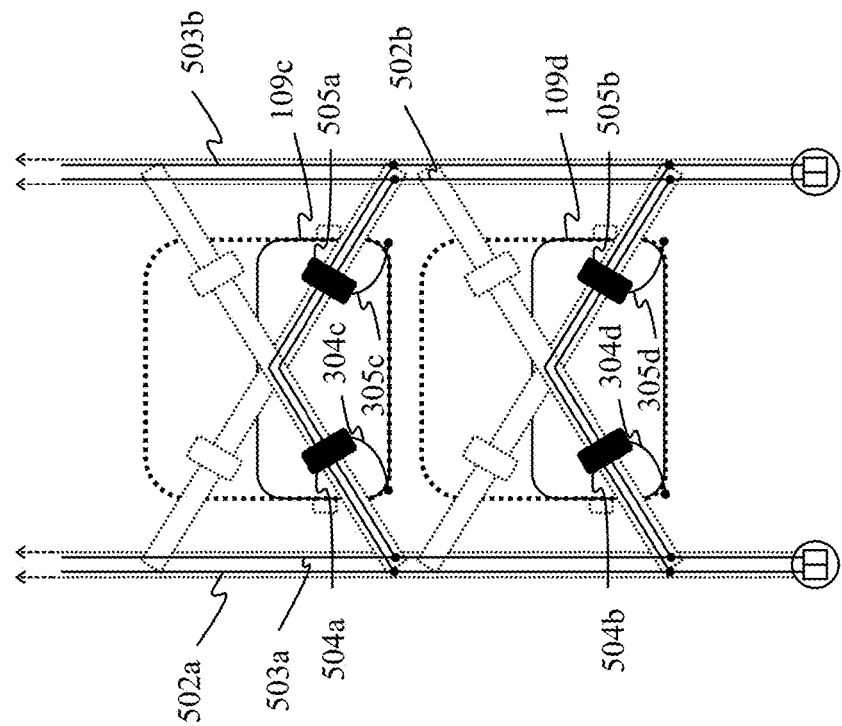
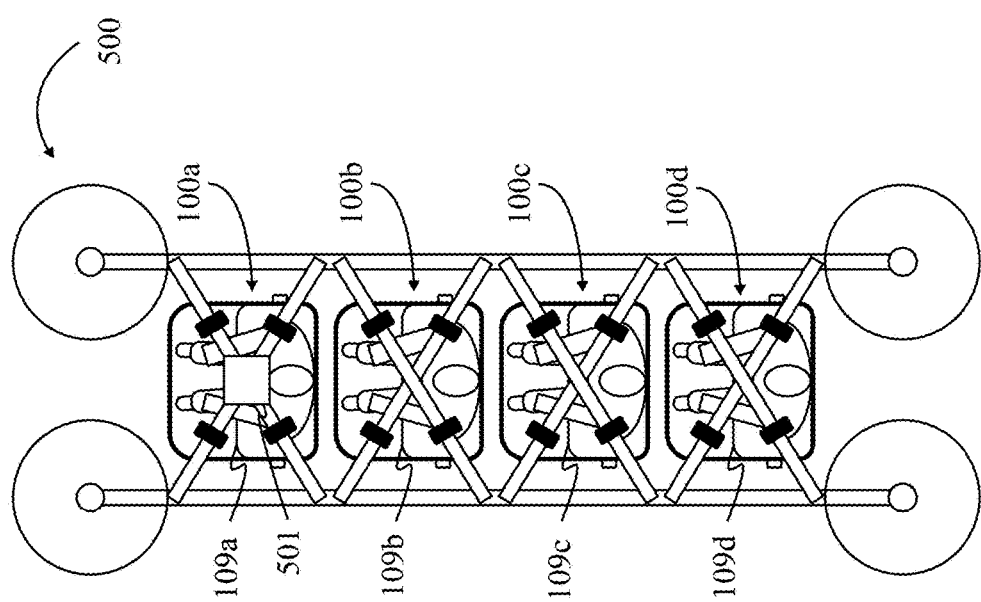
Fig. 5B
Fig. 5A

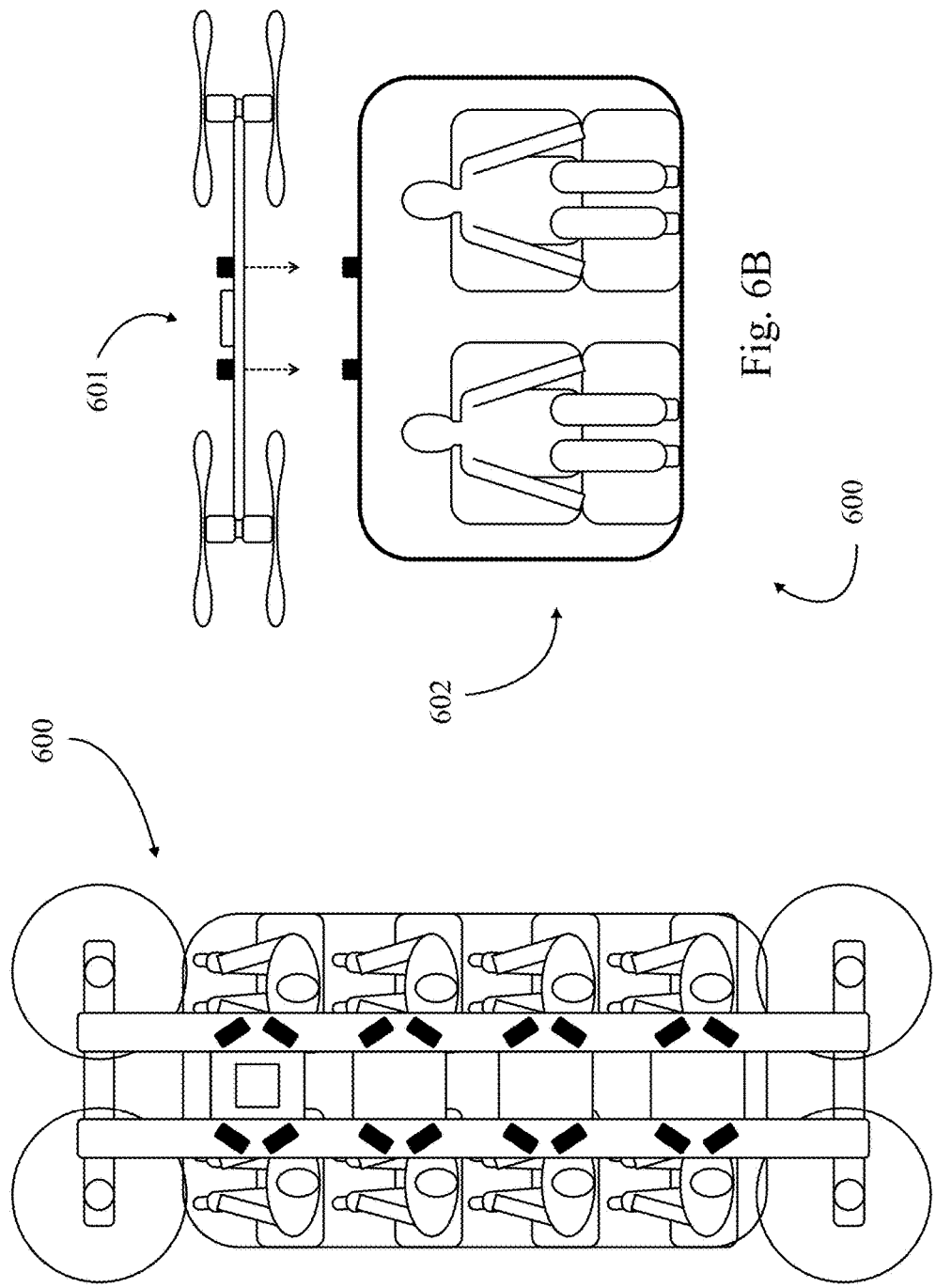

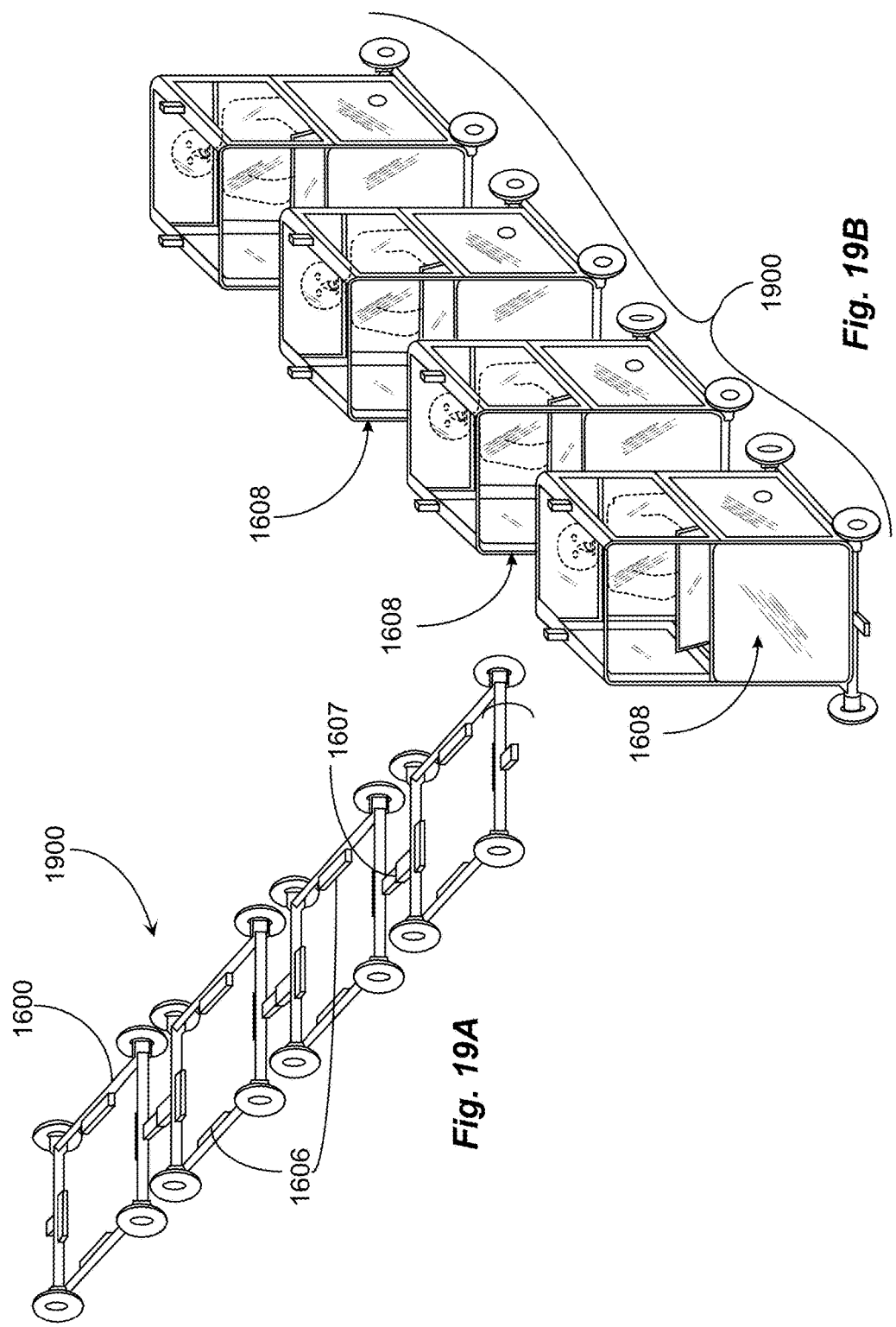

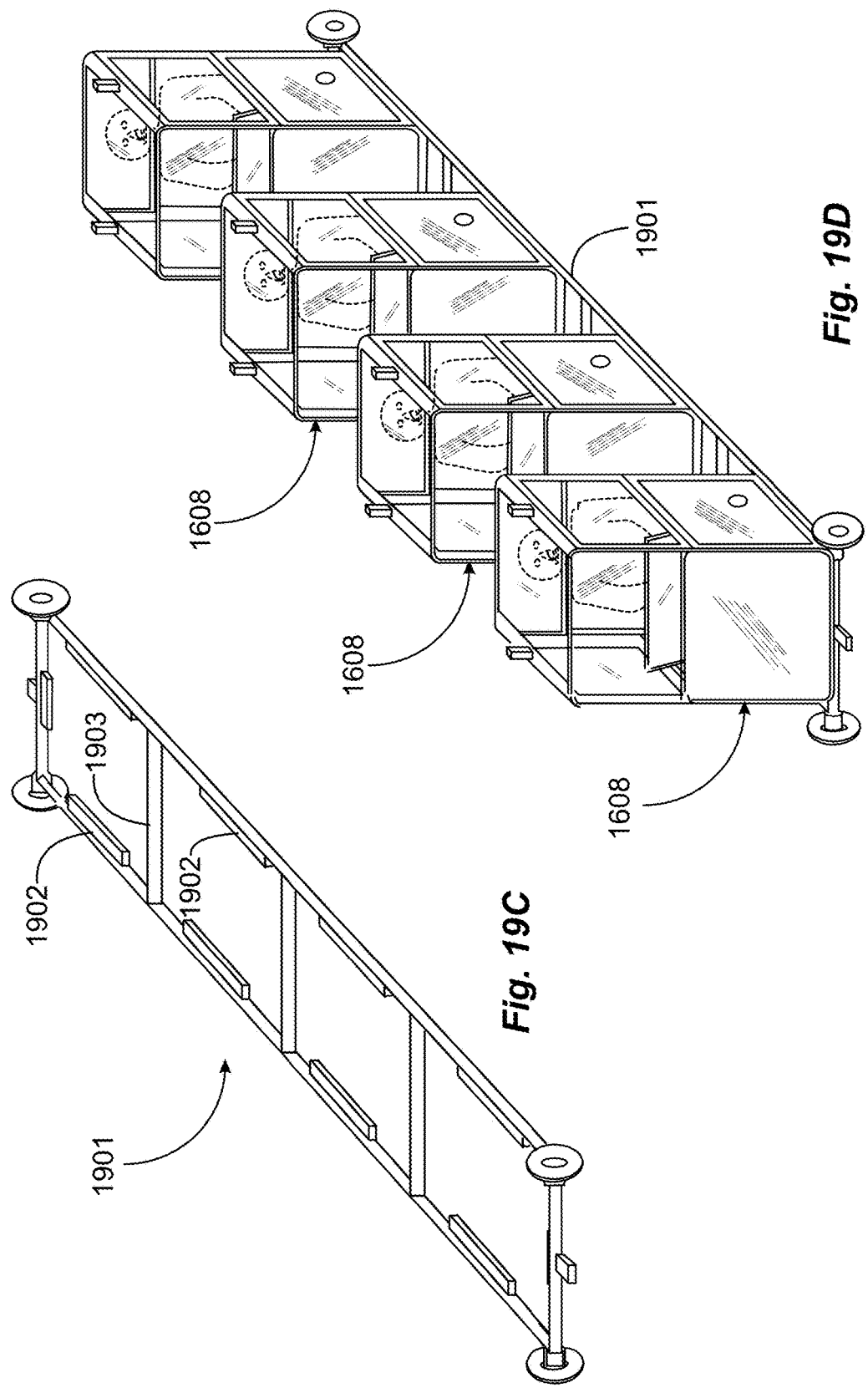

INTELLIGENT POD MANAGEMENT AND TRANSPORT

CROSS-REFERENCE TO RELATED DOCUMENTS

The present invention is a Continuation-in-Part of, and claims priority to, U.S. patent application Ser. No. 15/456,311, entitled "Drone Transport System", filed on Mar. 10, 2017, which claims priority to provisional patent application 62/443,187, filed Jan. 6, 2017. All disclosure of the parent applications is incorporated herein at least by reference.

BACKGROUND OF THE INVENTION

1. Field of the Invention

The present invention is in the field of transport systems and pertains particularly to methods and apparatus for enabling self-driving autonomous chassis for transporting pods and drones for carrying passengers or parcels in pods.

2. Discussion of the State of the Art

It is the opinion of many that passenger drones in coming years will slowly replace cars and small trucks, and will be able to carry one passenger, or multiple, or freight, such as parcels and other cargo. These drones will be autonomous, although under the control of networks, not humans. Most drones will be battery-driven, because battery technology is becoming cost competitive and improving rapidly, enabling batteries to store more energy while decreasing in size and weight.

Besides battery technology, other new technologies exist today to make passenger drones quite feasible: Examples are Internet of Things (IoT) to enable communication between a wide range of electronic devices; collision avoidance, including using video recognition; highly intelligent electronics that are also lightweight, cheap and small; advanced radio communications, such as the latest Wi-Fi specifications and upcoming 5G variants; advanced fast response motors and control; and new flying technologies and materials that are lightweight and strong. Also, the demand is now here for two major reasons. Firstly, three-dimensional, above-ground transport avoids rush hour traffic jams, where commuters all over the world get stuck every morning and evening wasting valuable time on a 2-dimensional surface. Secondly, for environmental reasons, because batteries plus electric motors eliminate the need for fossil fuels and are now cost competitive.

Currently there is a system known to the inventor, but not the public, and described in the priority documents as a drone transport system capable of engaging and transporting a pod that may hold one or more passengers or may be filled with parcels to deliver to a destination or may have a combination of passengers and freight.

The system alluded to above includes a carrier pod, hereafter pod, adapted for carrying a passenger or parcels with the passenger or parcels enclosed, the pod having an attachment interface for automated attachment to a drone. The flight-enabled drone is controllable to approach the pod from above, to align and engage the attachment interfaces to latch onto and to lift and carry the pod from one place to another, and to land and disengage the attachment interfaces, leaving the pod at a new place, and lifting off again.

The pod may include a seat and battery and can carry one person, or it may have no passenger seat and is dedicated to parcel delivery. The system as known to the inventor may include a variety of drones, such as one enabled to attach to and carry a plurality of passenger pods, or parcel pods, or a mixture of each. The flight-enabled drone, depending on design, may carry a plurality of passenger or parcel pods arranged linearly and oriented in the direction of flight. The pods may be adapted to carry a plurality of passengers each having seating for each passenger such as for example, four persons in seats one behind the other, eight people in two rows of four each.

The carrier drones comprise a plurality of electric motors driving a plurality of propeller rotors, a control system and wireless connectivity to one or more control stations. The system includes battery power lines from the pod and carrier drone batteries that may become connected through the attachment interface mechanism such that the drone may draw power from the connected pod to gain more flight time. In use of the system pods may be stored at pod exchange stations and may be picked up or dropped off at such stations localized for convenience to passengers headed to a destination.

The pods may be stored and picked up or dropped off at locations but otherwise do not move unless being carried by a drone. Therefore, what is clearly needed is a self-driving chassis for transporting pods that may be operated short distances outside of a pod station, such as to drive passengers or parcels to a destination without the aid of a drone.

BRIEF SUMMARY OF THE INVENTION

In one embodiment of the invention, a transport system is provided, comprising a wheeled, steerable, self-powered, self-navigating carrier vehicle, having a substantially planar support frame, an on-board, rechargeable, battery-based power system, control circuitry, including GPS circuitry, on-board the carrier vehicle, adapted to drive and steer the carrier vehicle, and an upward-facing carrier interface adapted to the support frame, the carrier interface having first physical engagement elements, and a passenger pod adapted to carry both packages and persons, the passenger pod having a structural framework, a rechargeable, battery-based power system, and a downward-facing pod interface adapted to the structural framework, the carrier interface having second physical engagement elements. The passenger pod, placed upon the carrier vehicle, engages the downward-facing pod interface to the upward-facing carrier interface by the first and second physical engagement elements.

In one embodiment of the transport system the control circuitry comprises wireless communication circuitry, enabling navigation and loading and unloading pods to and from carrier vehicles to be remotely-controlled. Also, in one embodiment, the pod interface and the carrier interface each have electrical and electronic engagement ports that engage and disengage when a pod is engaged and disengaged from a carrier vehicle, enabling carrier power and control signals from the pod. In one embodiment, the passenger pod comprises physical controls accessible by a passenger, enabling the passenger to navigate the carrier vehicle with the pod supported and engaged. And in one embodiment the system further comprises an upward-facing physical attachment interface as a part of the passenger pod, the upward-facing physical attachment interface compatible with a downward-facing physical attachment interface on a drone, enabling the passenger pod to be carried by the drone, to be deposited by the drone on the carrier vehicle, and to be picked up by the drone from the carrier vehicle.

In one embodiment of the invention the carrier vehicle is configured to carry a passenger pod carrying a single passenger. Also, in one embodiment the carrier vehicle has fore and aft-facing latches, enabling carrier vehicles to be joined end-to-end, and to be navigated as a single vehicle. Also, in one embodiment four carrier vehicles are joined in a column, enabling four single-passenger pods to be placed and carried on the joined column of carrier vehicles, which is enabled to be navigated as a single carrier vehicle. In one embodiment the carrier vehicle has fore and aft-facing latches, and left and right-facing latches, enabling carrier vehicles to be joined in columns and rows to carry passenger pods placed on the joined carrier vehicles in the columns and rows. And in one embodiment, carrier vehicles are joined by the fore and aft-facing latches and by the left and right-facing latches, forming a 2 by 4 array of carriers, enabling placement and transport of a single passenger pod on each of the joined carrier vehicles.

In one embodiment of the system, the carrier vehicle's substantially planar support frame is sized and enabled to carry four single-passenger pods in a column, with one set of wheels fore and aft. Also, in one embodiment the carrier vehicle's substantially planar support frame is sized and enabled to carry eight single-passenger pods in two columns, four pods per column, with one set of wheels fore and aft. In one embodiment, the passenger pod is a four-person pod, and the carrier vehicle carries one four-person pod. And in one embodiment, the pod is an eight-person pod in two columns and four rows, and the and the carrier vehicle carries one eight-person pod.

In one embodiment the system further comprises a charging station for charging batteries of pods and carriers, the charging station having a power supply and a conductor element enabled to connect to charging circuitry in passenger pods or carrier vehicles, as the carrier vehicles and pods pass the charging station, power being transferred from the charging station to the batteries in the pods or carrier vehicles. And in one embodiment the conductor element comprises a cable connected to the charging station, and controllable to connect to a charging port on a carrier vehicle or a passenger pod, and to stay connected while the carrier vehicle or passenger pod moves by the charging station.

In one embodiment, the conductor element comprises a rail presented along a direction of travel of a passenger pod or carrier vehicle, and the passenger pod or carrier vehicle comprises a sliding contact element enabled to contact and slide along the rail while passing the charging station, power being transferred from the charging station through the rail and the sliding element to a battery of the carrier vehicle or passenger pod. And in one embodiment the system further comprises a first ultra-capacitor in the charging station, and a second ultra-capacitor in charging circuitry of a passenger pod or a carrier vehicle, and wherein the charging station charges the first ultra-capacitor between charging cycles involving passenger pods or carrier vehicles, and during a charging cycle, the first ultra-capacitor charges the second ultra-capacitor, and the second ultra-capacitor charges the passenger pod or carrier vehicle battery after leaving the charging station.

BRIEF DESCRIPTION OF THE SEVERAL
VIEWS OF THE DRAWINGS

FIG. 1A is a side view of a single-person pod occupied by a person according to one embodiment of the present invention.

FIG. 1B is a side view of a pod occupied by a plurality of parcels to be delivered according to one embodiment of the present invention.

FIG. 1C is a top view of a single-person pod occupied by a person according to one embodiment of the present invention.

FIG. 2C is a rear view of a single-person pod attached to a transport drone according to one embodiment of the present invention.

FIG. 2D is a front view of a single-person pod attached a to transport drone according to one embodiment of the present invention.

FIG. 3A is a top view of a transport drone with an attached pod with a wiring layout according to one embodiment of the present invention.

FIG. 3B is a side view of a pod with a wiring layout according to one embodiment of the present invention.

FIG. 3C is a back view of a pod with a wiring layout according to one embodiment of the present invention.

FIG. 5A is a top view of a 4-pod transport drone capable of transporting four single-person pods according to one embodiment of the present invention.

FIG. 5B is an in-depth top view of a segment of a 4-pod transport drone according to one embodiment of the present invention.

FIG. 6A is a top view of a transport drone capable of transporting an eight-person pod according to one embodiment of the present invention.

FIG. 6B is a front view of a transport drone capable of transporting an eight-person pod according to one embodiment of the present invention.

FIG. 19A is a perspective view of a train of pod chassis.

FIG. 19B is a perspective view of a pod plus chassis group linked together or aligned by command to travel in line.

FIG. 19C is a perspective view of a chassis in another embodiment of the invention.

FIG. 19D is a perspective view of pods carried by the chassis of FIG. 19C.

DETAILED DESCRIPTION OF THE INVENTION

Figure 2A:
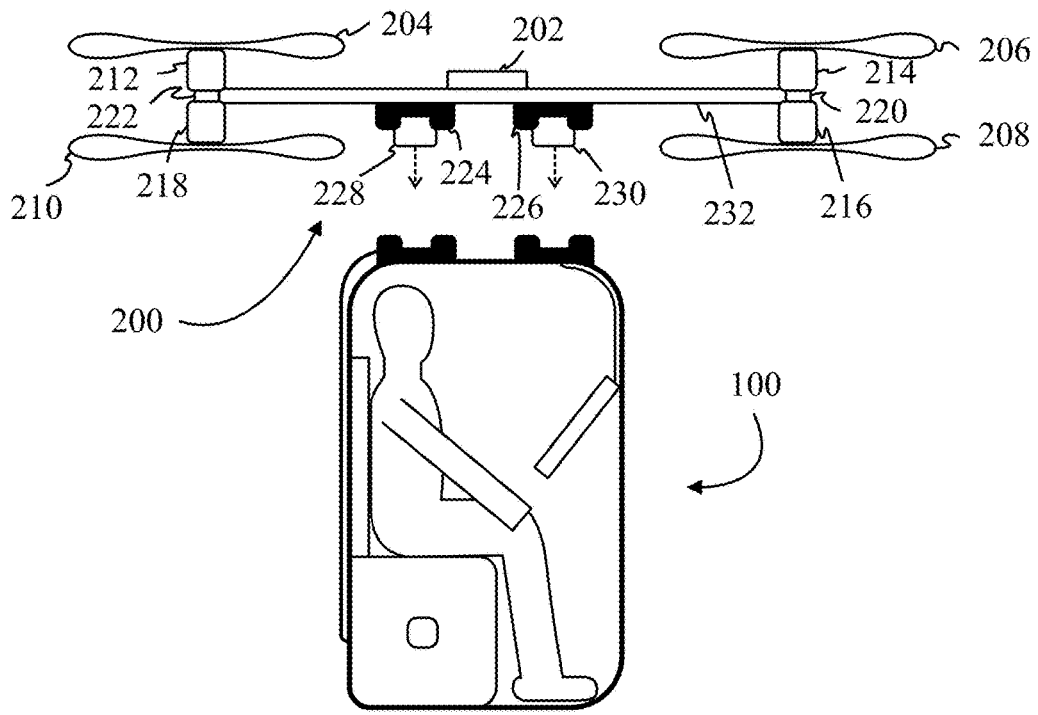
FIG. 2A is a side view of a single-person pod soon to be attached to a transport drone according to one embodiment of the present invention.
Figure 2B:
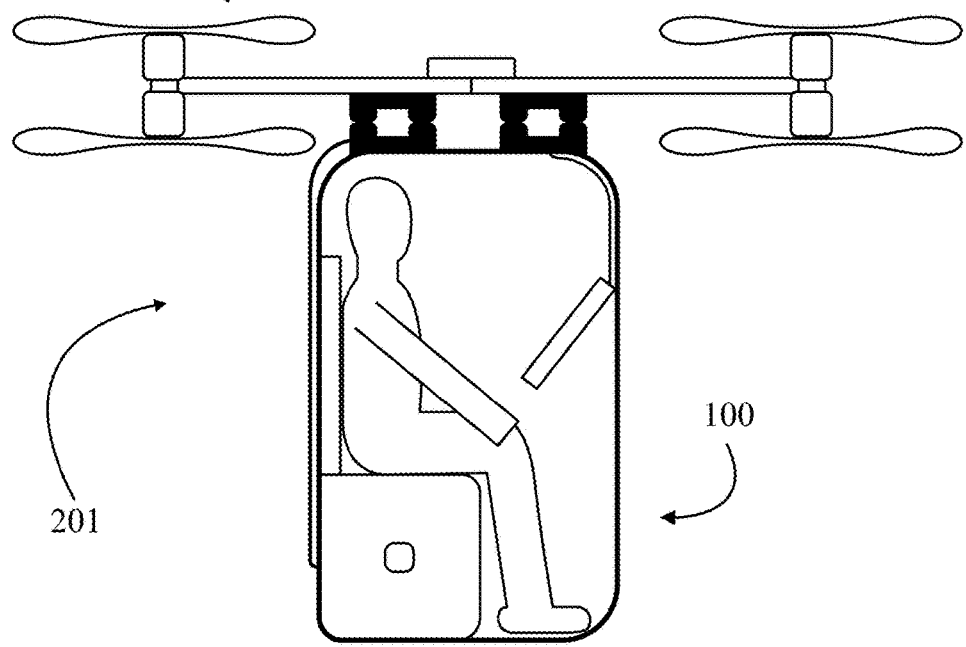
FIG. 2B is a side view of a single-person pod attached to a transport drone according to one embodiment of the present invention.
Figure 2E:
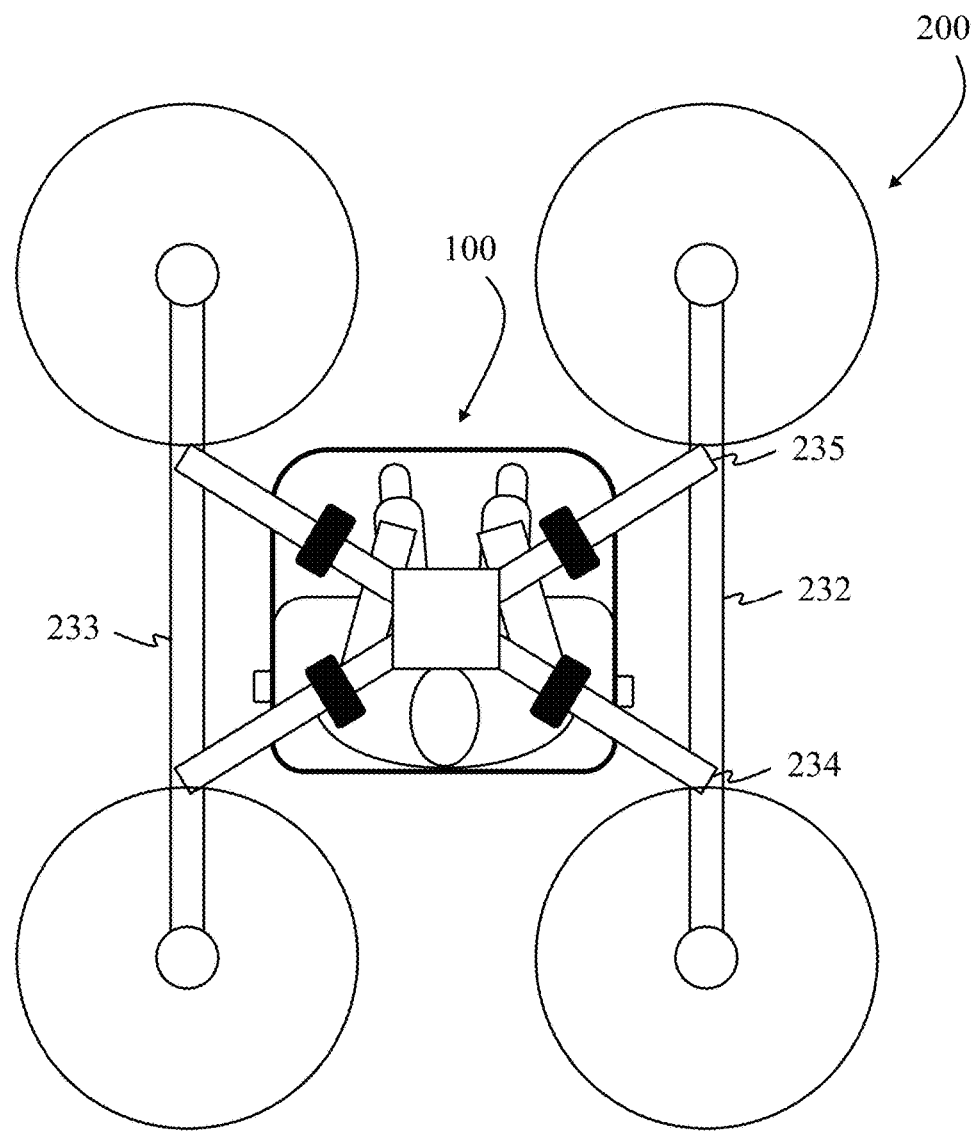
FIG. 2E is a top view of a single-person pod attached to a transport drone according to one embodiment of the present invention.

In various embodiments described in enabling detail herein, the inventor provides a unique drone enabled transport system that includes self-navigating chassis carrying pods, that may carry passengers or parcels. The present invention is described using the following examples, which may describe more than one relevant embodiment falling within the scope of the invention.

Single Pod Drones

What is generally proposed as unique in embodiment of the invention is a drone and pods which may separate from each other. All pods in this system may conform to a standardized drone-pod attaching system, and the pods may be used to carry passengers, parcels, or both.

FIGS. 1A to 1C are illustrations of a pod 100 according to one embodiment of the present invention. Pod 100 comprises a capsule about the height of a passenger 107 while seated and around 1 m×1 m (3'×3') in width and depth. These dimensions are exemplary and may vary considerably. Pod 100 may have four latches on its roof, labeled 101 through 104, in order to latch the pod to a transport drone, as explained in further detail below. In the embodiment illustrated, a single occupant 107 is inside pod 100, but pod 100 may be adapted for other arrangements, such as, but not limited to, a mother with baby, or two small children, or an adult with an animal, such as a dog, or an adult with baggage that will fit in an overhead luggage compartment that may be present. Pod 100 may have a maximum weight limit for the total load, above which the drone may not take off as a safety precaution. A pod control box 108 present in pod 100 may display the present weight of the contents of pod 100, along with other relevant information. Pod control box 108 is further detailed below. Besides being used to transport passengers, pod 100 may be used to transport parcels 111[1-n], as shown in FIG. 1B. Parcels 111[1-n] may be loaded in at an approved parcel bay by a qualified loader.

Each pod 100 may have a highly intelligent pod control box 108 that has its own touch screen display in front of occupant 107. The control may box may be foldable to be flat against the front side in the case of transporting parcels 111[1-n], but relevant information may remain visible from the outside in case of issues. Pod control box 108 links up to the roof of pod 100 by wired or wireless connection for connecting to a drone. In one embodiment of the present invention, control box 108 may be an internet-connected interactive screen with a highspeed internet link to a drone management system for both communications and entertainment of passengers. The control box 108 is powered from the pod's battery, via two cables, one on each side of the pod, for dual redundancy.

In one embodiment, as passenger 107 enters through a side door, the side door closes and auto-locks after passenger 107 is seated. Under the seat is a battery with charger controller 109, both located where they are not in the way. Battery and charger controller 109 may also be significantly heavy enough, such that the center of mass is shifted towards the bottom of a drone-pod unit, therefore providing increased stability. The battery is charged through the charger controller via either a first charging receptacle 110 or a second charging receptacle 112, allowing pod 100 to be charged from either side, or potentially from both sides simultaneously. Charging receptacles 110 and 112 may use any charging standard used in the art. The battery is connected to an attached drone in this example with two redundant identical cables going to the roof of pod 100, as is further detailed below.

FIGS. 2A through 2E show various views of drone 200 attaching to pod 100 to form a pod-drone unit 201 according to one embodiment of the present invention. Drone 200 flies above pod 100 and is connected to the roof of pod 100. Drone 200 may have four of its own compatible latches to compliment pod latches 101 to 104, a first drone latch 224, a second drone latch 225, a third drone latch 226, and a fourth drone latch 227. The latches used in this embodiment are a male and female set, with the male latches attached to drone 200, as indicated with male protrusions 228 and 230. Any latching system commonly used in the art may be used as substitution. Latches 224 to 227 are attached to two diagonal cross struts on drone 200, a first cross strut 234, and a second cross strut 235. It should be understood that the idea of cross struts 234 and 235 is to give drone 200 in this embodiment added stability in all directions, but other designs may be used in its place. The four pairs of latches 101 to 104 and 224 to 227 are for redundancy in case one or even two latches may break or decouple. Latches 101 to 104 and 224 to 227 may be designed to withstand carrying a fully loaded pod with any two latch sets functioning.

Motors 212 to 219 are shown at corners of drone 200, attached to eight motor-drivers in pairs 220 to 223, with two motor-rotor combos per corner, totaling eight totally independent rotors. Each of motors 212 to 219 are attached to its own rotor (propeller) 204 to 211, totaling eight propellers to provide lifting power to drone 200. Drone 200 also has its own control box 202, shown mounted at the junction of the cross-struts 234 and 235. Drone control box 202 works in unison with the pod control box 108 for dual redundancy.

Cross struts 234 and 235 are connected to two front-to-back struts, a right front-to-back strut 232, and a left front-to-back strut 233, with the motors and rotors at each end. Drone 200 may have its own battery, which may comprise small batteries fixed to struts 232 to 235, where they may be positioned in a manner which enables easy access for replacement or maintenance. The total energy available from the drone batteries may be enough to allow an empty drone with no pod to fly for approximately thirty minutes to one hour. This flying duration may improve as battery technology improves. While carrying a pod, pod-drone unit 201 utilizes the larger pod battery 109 and the drone battery does not discharge, allowing for continuing in emergency flight in the case of loss of power of the pod battery. The pod battery is much larger in weight and kWh, and all of the stored energy of a loaded drone may be provided by the pod battery 109. The drone batteries may only activate once the voltage of pod battery 109 has dropped below a certain predetermined safety threshold that indicates it may no longer provide sufficient power. If the drone battery needs to be recharged, it may receive a charge from pod battery 109 whenever the pod battery voltage is larger.

FIG. 3A shows a wiring diagram for a pod-drone unit 201 according to one embodiment of the present invention. Whereas FIGS. 3B and 3C shows various angles of wiring for a pod unit 100 according to one embodiment of the present invention. Irrelevant portions have been drawn in dotted lines to increase viewability of relevant parts. The pod has two cables, a first cable 304 and a second cable 305, connected to pod battery 109 and traveling up the rear corners of pod 100 (to avoid collisions with the pod behind with four pod drones), and, in this example, are shown connecting through rear pod latches 101 and 104 and to drone latches 224 and 225, once latched, and finally to the cables on the struts of the drone. In this embodiment, the purpose of the two cables 304 and 305 is redundancy for increased safety and reliability. Designers may prefer to link via separate connectors on the roof of pod 100. The two identical cables 304 and 305 each comprise a power line and a ground return, totaling two of each—a first powerline 301a in first cable 304, and a second power line 301b in second cable 305; and a first ground return 302a in first cable 304, and a second ground return 302b in second cable 305. Power lines 301a and 301b go to the front and back motors on both upper and lower sides. At each motor, they provide power to two motor driver-circuits duplicated, with their own control signals and outputs linked together at the motor terminal. This ensures full power line redundancy from pod battery 109 all the way to each drone motor terminal.

Pod control box connection cables 306 and 307 may connect to the front latches of pod 100 to provide a means to connect the pod control box to the drone control once latching has occurred. This is to create a wired interface between pod and drone for communication purposes and may be augmented by a wireless connection for dual redundancy.

Figure 4:
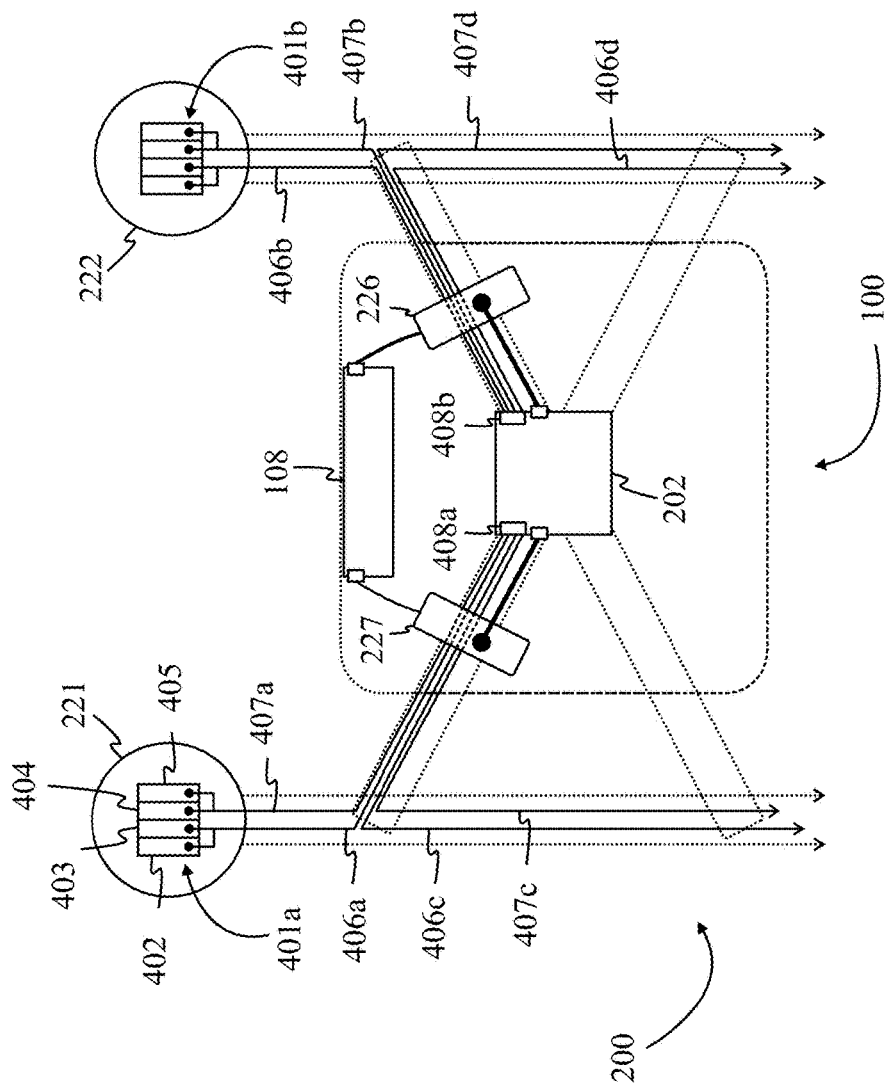
FIG. 4 is an in-depth top view of a transport drone with an attached pod with a wiring layout according to one embodiment of the present invention.

FIG. 4 illustrates a portion of a pod-drone unit 201 showing pod control box 108 and drone control box 202, and a wiring layout according to one embodiment of the present invention. The drone control box 202 is powered from the drone's battery, via two cables, one on each of the diagonal struts, for dual redundancy.

For redundancy, both pod and drone control boxes 108 and 202 include identical controls for navigation, communications, and transport. Differences may include pod control box 108 having a display for a passenger, and drone control box 202 may have eight identical pairs of digital motor control pulse pairs that connect, by wires 406a to 406d and 407a to 407d, to motor driver circuits 401a and 401b present at each corner. Motor driver circuits 401a and 401b may comprise a lower motor left driver circuit 402, a lower motor right driver circuit 403, an upper motor left driver circuit 404, and an upper motor right driver circuit 405. Although only one set of driver motor circuits is individually labeled, and two sets illustrated in FIG. 4, it should be understood that the same arrangement of driver circuits may be found in all four corners of drone 200 as denoted by 401a and 401b, with theoretical 401c and 401d. As with the power lines, there is full dual redundancy between the two control boxes 108 and 202 and also the drive signal pairs from drone control box 202 to each of the 8 motor control terminals. These signals then drive the digital motor controller.

During normal operations drone control box 202 may be considered the master controller provided both box control signals are identical. If a difference is detected both control boxes work together to determine which one is functioning correctly and that control box assumes the role of master device. Similar systems are presently in use on airplanes.

Multi-Pod Drones

FIG. 5A shows a proposed 4-pod drone 500, also called a quad-pod drone, according to one embodiment of the present invention. The design is similar to 1-pod drone 201 but with capabilities of latching to and transporting up to four individual pods, being a first pod 100a, a second pod 100b, a third pod 100c, and a fourth pod 100d, one behind the other. Each set of latches may be individually controllable so any of the pods may be released without effecting the latching of other pods. So, it is not necessary that all four pod positions be utilized. A drone control box 501 of 4-pod drone 500 is located above front pod 100a. Motor-rotor pairs 506 to 509 of 4-pod drone 500 may be larger than those found on the 1-pod drone 200 to enable 4-pod drone 500 to carry three extra pods, and may also enable it to travel at greater speed. The 1×4 configuration may result in less air resistance than a 2×2 configuration or even a 4×1 wide configuration because the back three drones 100b to 100d are sheltered behind first pod 100a. A wind screen may additionally be fitted on drone 500 in front of first pod 100a to reduce air resistance to first pod 100a. Pods 100a to 100d may be designed to bounce air away from a pod directly behind them, creating a vacuum effect between the pods. The 1×4 configuration may also make balancing drone 500 in flight easier.

In other embodiments of the present invention, it may be possible for additional dual motor-rotor units to be placed in between the front and rear dual motor-rotor units to offer drone 500 more redundancy, higher speed potential, and better lifting capability.

FIG. 5B is an illustration of a segment of 4-pod drone 500 with a wiring layout according to one embodiment of the present invention. All four batteries 109a to 109d from the four connected pods 100a to 100d may be connected in parallel with power cables 502a 502b 503a and 503b for redundancy inside the struts of drone 500, and are protected in each battery compartment from any other battery voltage dropping due to failure.

Control circuitry for 4-pod drone 500 is similar to the circuitry of 1-pod drone 200 shown in FIG. 4. This may significantly simplify the design of the 4-pod controller. The control algorithms for 4-pod drone control box 501 may be different, but the navigation, communications, and transport control may be the same. Additionally, the 4-pod drone control box 501 must communicate with up to 4 pod control boxes present in each of connected pods 100a to 100d. With good planning and design, it may be possible for the 1-pod and 4-pod control boxes to be identical, for example, with the presence of an input wire or multiple wires for detecting what kind of drone a pod is connected to. Maybe with some communication control information exchanged as well.

Although single-person pods may have advantages, such as versatility, cross-operation with abovementioned 1-pod drones or 4-pod drones and allowing passengers to remain in the same pod throughout their journey, some passengers may prefer to travel with others in the same pod. For example, families, or just couples with luggage, or small groups, or to have a meeting while traveling, or even just to be with other people. As such, there may be a need for multi-person pods. Multi-person pod 602, as seen in FIG. 6B, may be a detachable unit similar to a single-passenger pod 100 found in the 1-pod or 4-pod drone embodiments, or the drone and pod may be a semi-permanently attached unit only removed for replacement or maintenance. FIGS. 6A and 6B show an 8-person pod 602 and drone 601 attached to create a complete pod-drone unit 600 according to one embodiment of the present invention. Seating may be arranged in a 2×4 formation with an aisle down the middle with four seats on each side. Pod-drone unit 600 may require larger motors and rotors, or may just employ a greater number of motors and rotors situated in between the four motors present at the corners of drone 600. In this embodiment, multi-person pod 601 is detachable as shown in FIG. 6B, but in uses where there is no advantage, multi-person pod 601 may be an integral part of drone 600 and is only detached to be replaced or for maintenance purposes. Multi-person pod 601 may have batteries underneath each seat similar to pod 100, as this saves space and ensures stability in flight with the center of gravity lower in the overall structure. The batteries will still need to be charged, and the pod may use identical receptacles and chargers as those found on single passenger pod 100. This may allow multi-person pod drones to be charged along-side 1-pod and 4-pod drones on predetermined drone pathways at the same charging stations.

Exchange Stations

An exchange station enables 1-pod drones, from the suburbs or other low usage areas, to link up with higher speed 4-pod drones going to a next exchange station. Exchange stations may also provide an ability for pods to change from one 4-pod drone to another 4-pod drone to fly to another exchange station onwards and eventually switch back down to a 1-pod drone to fly to a final destination. Exchange stations also accept passenger entry and exit through a passenger terminal, as well as parcel management, with full intermixing of parcel pods with passenger pods.

Figure 7A:
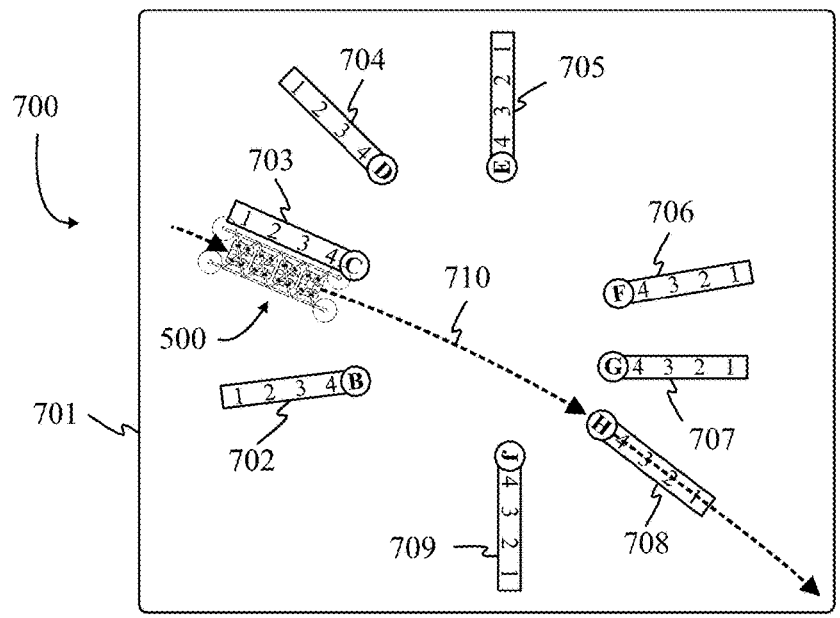
FIG. 7A is an illustration of an exchange stations with a plurality of loading bays and one potential flight path when wind is negligible of a transport drone according to one embodiment of the present invention.

FIG. 7A is an illustration of an exchange station 700 using 4-pod drones 500 with an example travel route 710 according to one embodiment of the present invention. Although only a single 4-pod drone 500 is shown, it should be understood that there may be a plurality of drones, both 1-pod drones and other 4-pod drones, flying in or around the vicinity of exchange station 700 throughout usual operation. This embodiment comprises eight loading bays 702 to 709, but it may be possible to have exchange stations of various numbers of loading bays, for example an exchange station in a low traffic area may have fewer loading bays and vice versa. Although exchange station 700 in this embodiment is circular in shape, as shown by illustrated boundary 701, in some cases it may take other shapes in order to fit in a particular space or to maximize efficiency. Each loading bay 702 to 709 may have any combination of other features of an exchange station such as a passenger terminal with an associated transit bay linking it into the present exchange station, a 1-pod drone bay where both empty pods and 1-pod drones may be stored, a 4-pod drone bay for empty 4-pod drones, a charging bay which may be a part of the transit bay which may include a rest area for any passing drone that needs charging, and an optional parcel bay where parcels may be brought in or taken out at any time.

There may be a backup reserve loading bay present at each loading bay in case the primary one is still loading while another drone is instantly arriving at the same loading bay. Another example may be the primary loading bay has already been offloaded with three pods and another drone is arriving with two, three, or four connected pods going to the same exchange station.

A loading bay may face its corresponding target exchange station to eliminate any need to turn towards the target exchange station on take-off, unless there is a strong wind, such that a loaded 4-pod drone may take off without interfering with other drones which may be also taking off.

As mentioned previously, being small flying machines, drones may be affected by the weather more than other forms of transport. As drone transport gains popularity, people may still require to get from one point to another using drones and this will put pressure on system operators to maintain a continual flow of drones in less than ideal conditions. The main constituent of weather that affects drones may be wind. It may be assumed that as machine intelligence becomes more advanced, that even the first passenger drones may be able to fly in conditions with poor visibility, such as, but not limited to, heavy rain, snow, and total darkness. However, they may still be affected by wind. Up to a certain wind speed, drones may simply fly at an angle relative to the direction of travel to maintain the correct course. As drone technology progresses, this minimum safe wind speed may increase. Gusts of strong wind may make flying even more difficult, and in some extreme conditions, a system shutdown may be unavoidable.

Figure 7B:
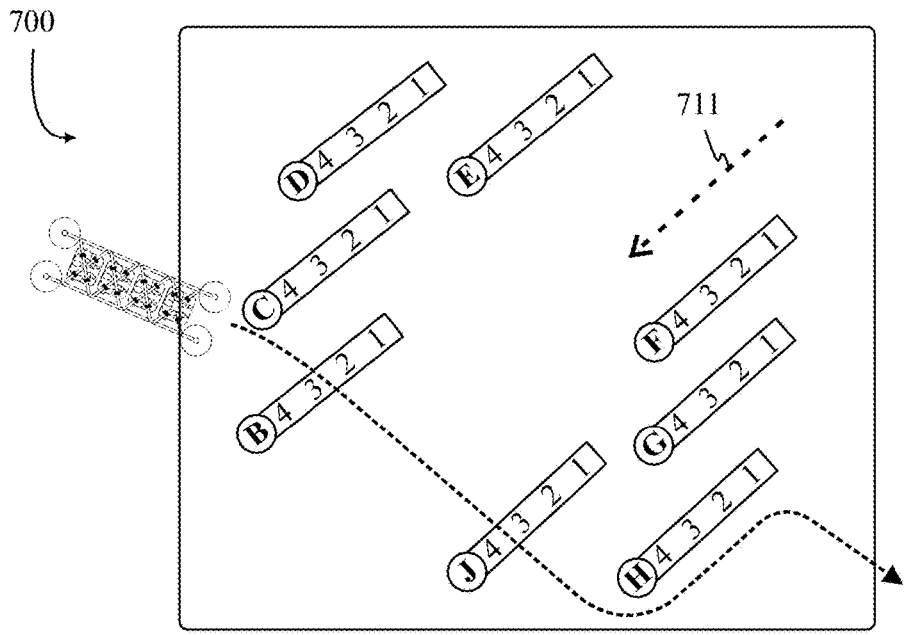
FIG. 7B is an illustration of an exchange stations with a plurality of loading bays and one potential flight path with significant wind according to one embodiment of the present invention.

Landing and taking off may be the most dangerous part of flying and may also be the part that is most impacted by strong, gusty crosswinds. For this reason, it may be necessary to allow loading bays 702 to 709 to be rotatable into the wind. FIG. 7B shows an embodiment of the present invention in which loading bays 702 to 709 are rotatable relative to wind 711 indicated by a dashed arrow so that impact of the wind on drones taking off or landing is lessened and more easily manageable.

Other embodiment examples of potential exchange station types and layouts are presented and explained in greater detail below.

Drone Transport System

Figure 8:
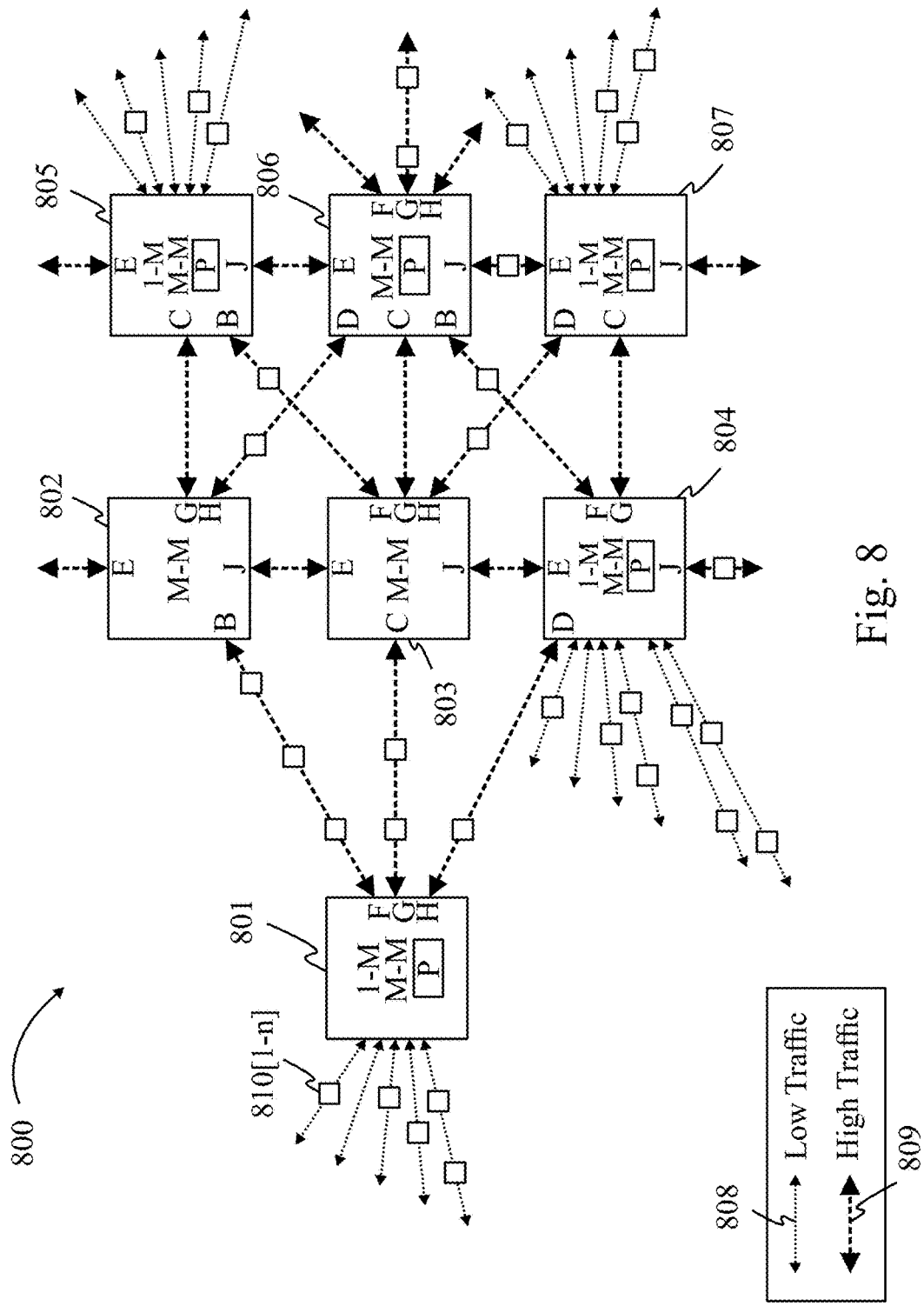
FIG. 8 is an illustration of a segment of a wider system with a plurality of exchange stations interconnected by various flight paths according to one embodiment of the present invention.

FIG. 8 illustrates an example segment 800 of a wider system of stations in which 1-pod drones and 4-pod drones may be interconnected in a typical city according to one embodiment of the present invention. System segment 800 comprises a plurality of exchange stations 801 to 807, which are explained in further detail below, interconnected with drone pathways denoted by arrows. A smaller, dotted arrow 808 may be lower traffic volume, and more regulated drone flight paths, intended mainly for 1-pod drones. A thicker, dashed arrow 809 may be higher traffic volume, with a higher speed limit for drone flight paths that may be utilized by any drone type.

Exchange stations may not necessarily be capable of accepting all types of drones. In example segment 800, exchange stations are annotated with their capabilities. A "1-M" indicates that that particular exchange station is capable of accepting 1-pod drones, and may transfer the pod carried by the 1-pod drone to a loading bay with other pods to be picked up by a multi-pod drone. A "M-M" indicates that that particular exchange station has facilities to accept multi-pod drones and can transfer pods to various different multi-pod drones. A "P" indicates that that particular exchange station has facilities for parcel pods. Letters around the inner edges of each exchange station indicate loading bays.

This embodiment of segment 800 employs multi-pod drones up to 4-pod drones 500. It may be that 1-pod drones 200 and 4-pod drones 500 will be introduced first into the system, and as technology, reliability, and experience improves, drones of increasing size and complexity may be introduced and may utilize the same system and infrastructure.

Along the way, between exchange stations 801 to 807, a plurality of charging stations 810[1-n] may be strategically placed in order to allow drones to travel longer distances between exchange stations 801 to 807 or between residences or offices and other exchange stations.

It is not required for drones to stop at any particular exchange station if a drone has enough charge to venture to a next exchange station on a pre-determined path. For example, a 1-pod drone may decide to bypass an exchange station if its occupant wants to travel alone or owns a private pod or even a private drone. Or instead, the occupant may want to stop and just take a break, while charging the drone's and pod's batteries in a charging bay. Similarly, a 4-pod drone may decide to bypass an exchange station if its occupants are all heading to a common next exchange station. Because the drone system knows the drone does not need to visit the upcoming exchange station, occupants may receive a prompt on the screen in their pods to check whether or not they wish to stop to just take a break and charge the drone's and pod's batteries in a charging bay.

Exchange Station Types

There are two basic types of exchange station proposed here where incoming drones may offload their occupants at each pre-determined target loading bay, or incoming drones may offload their pods at a pre-determined arrival bay dock, from which the pods may be directed automatically to transfer along pre-determined transfer paths to their target loading bays. These are just a few potential embodiments, and it should be understood that various types may be mixed and used in a single system.

Drone Offload Exchange Station

Figure 9:
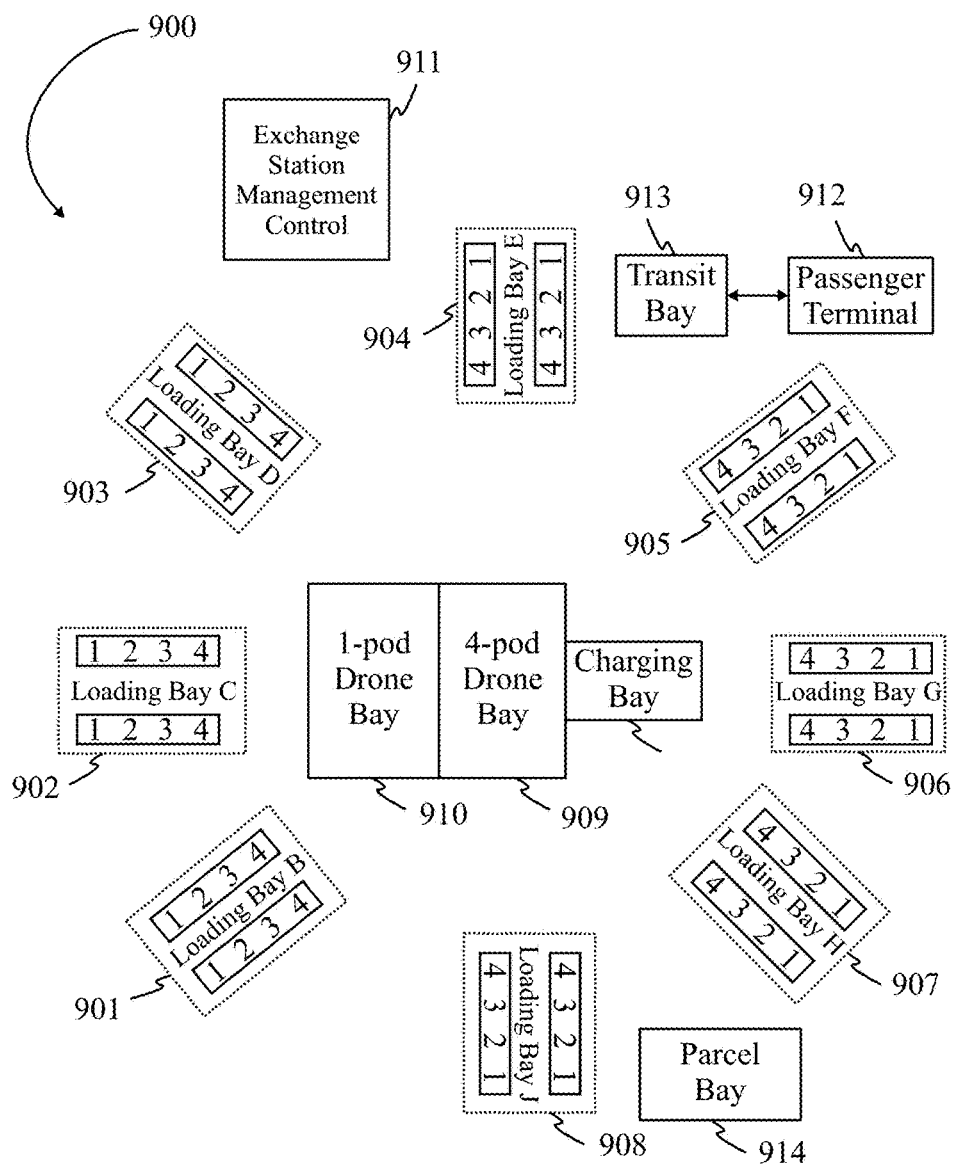
FIG. 9 is an illustration of a drone offload exchange station according to one embodiment of the present invention.

FIG. 9 shows a drone offload exchange station 900 according to one embodiment of the present invention. Drone offload exchange stations may be smaller, less complex exchange stations for drone and pod pickup and drop-off. They may be located on the periphery of a city, such as in the suburbs, or just a small town where there may only be few connecting exchange stations.

Drone offload exchange stations comprises a set of loading bays, eight are illustrated in FIG. 9, loading bay B 901, loading bay C 902, loading bay D 903, loading bay E 904, loading bay F 905, loading bay G 906, loading bay H 907, and loading bay 908. Each loading bay 901 to 908 may have one or more separate loading docks for drones to drop off pods. Backup docks may be implemented in exchange stations that expect a higher volume of drone traffic enable multiple drones to drop-off pods simultaneously. It should be understood that although eight loading bays are illustrated in this embodiment, it may be possible to have as few or as many loading bays as needed as space allows. Loading bays may be arranged in such a fashion that they may be located towards the direction of respective exchange station designation. This may reduce the number of flight path crossing as drones take off and fly to their designated exchange stations. Drones may land at a target loading bay, and after offloading all pods, may park in a designated drone parking area, a 4-pod drone bay 909, or a 1-pod drone bay 910. This embodiment only utilizes one of each drone bay, but it may be possible to have as many as needed to provide space for drones that may be on standby. In a future embodiment in which drones of various shapes and sizes are introduced, there may be more parking areas designated for each drone type, or one area may be designated for mixed drone parking.

Passengers intending to commute by drone may be processed through a passenger terminal 912 where they may check-in, purchase tickets, or request any special arrangements such as having luggage they may need to transport as well. Some exchange stations may need a security check. From passenger terminal 912, a passenger enters a transit bay 913 to enter a pre-charged pod designated to them while processing through the passenger terminal, and to wait to be transferred to a loading bay with other pods heading to a similar next exchange station.

An exchange station management control system 911 may wirelessly communicate with drones flying in its vicinity and control the flow of drones to and from each loading bay as well as to and from each parking area. It may be difficult and somewhat risky to allow more than one incoming drone to be flying around offloading at the same time. A sequential method may be used to simplify logistics: only when a drone has finished offloading can a new drone enter the exchange station. Drone offload station 900 may be suited for smaller stations that are not expected to be very busy, such as in the suburbs where commuters may call up drones for transport from home to work and back to home, or for sub-exchange stations in work areas or shopping malls where passengers may enter or exit close to work or shopping areas. With careful layout of the bays etc. it should be possible to upgrade fairly easily to an arrival bay type of exchange station if for example the station gets busier over time.

As an example, an incoming first 4-pod drone from a neighboring exchange station may descend to a certain height above the ground and hover over a first loading bay, drop down to ground, unlatch the relevant pod or pods, and fly to a next loading bay, offload more pod or pods, and repeat for as many different loading bays as needed to put all pods where they are designated to go, and may finally park itself in a predesignated parking spot or may dock for charging. A second 4-pod drone, arriving while the first drone is still offloading, may have to wait until the first one finishes before it may start its offloading procedure. This is because the second drone may be arriving from a different direction and may conflict with the first drone while offloading at the same loading bay. This forces incoming drones to be only offloaded sequentially, which slows the offloading down. And offloading itself may not be quick, because each time a drone offloads it must ascend to a safe altitude, fly to the next loading bay, drop to ground level, unlatch, and ascend again, etc.

A parcel bay 914 may be present as an area accessible to only qualified staff and personnel. This area may be designated for the loading and unloading of pods carrying parcels to be transported by drones to other exchange stations in order to reach a final destination.

Figure 10:
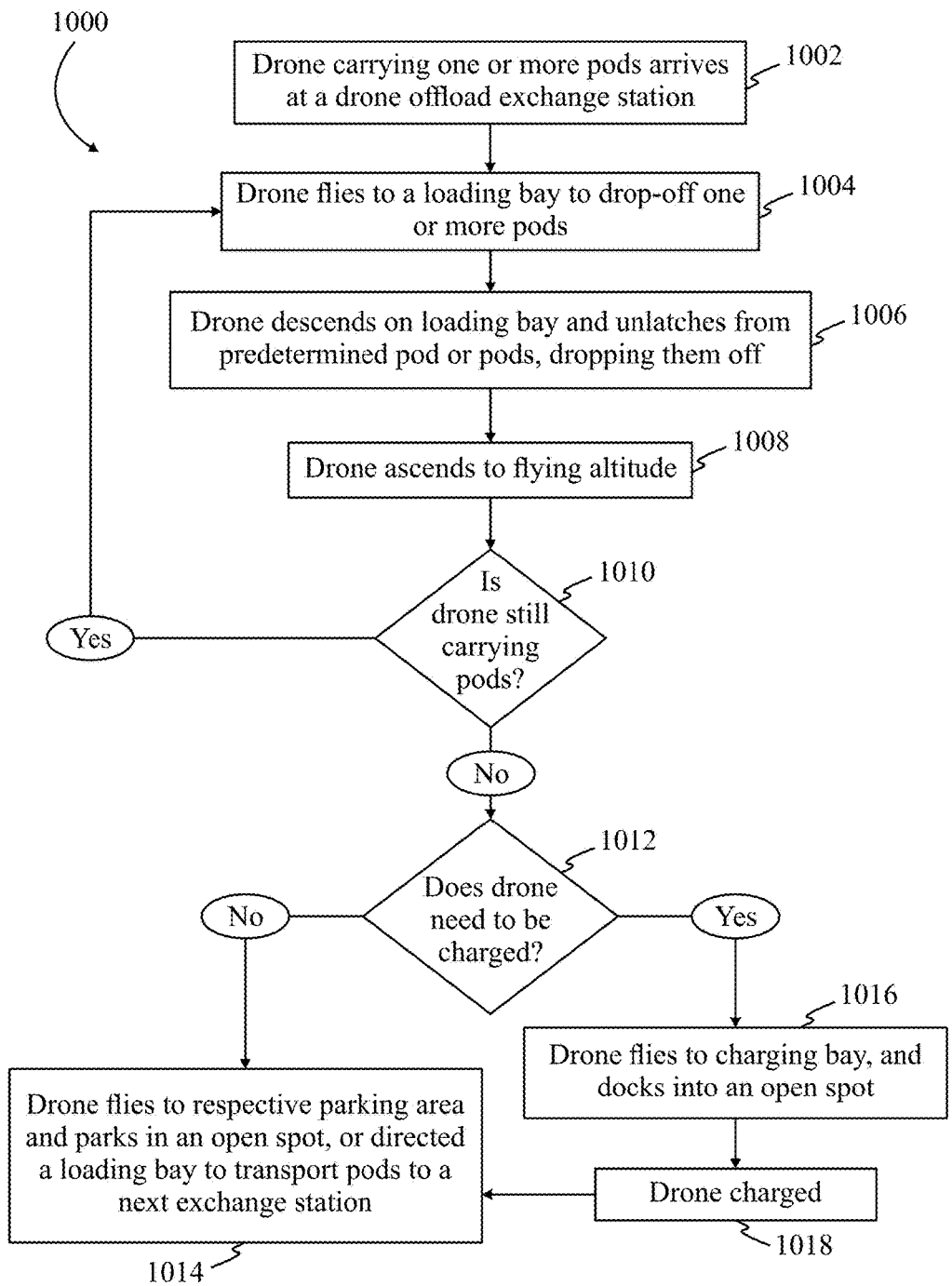
FIG. 10 is a flowchart of a method for arrival and unloading of a drone carrying pods at a drone offload exchange station according to one embodiment of the present invention.

FIG. 10 is a flowchart 1000 of a method for arrival and unloading of a drone carrying pods at a drone offload exchange station according to one embodiment of the present invention. The process is similar for both 1-pod and 4-pod drones. At step 1002, a drone carrying pods arrives at a drone offload exchange station. At step 1004, the drone flies towards a first loading bay where it may drop off one or more pods. For efficiency purposes, incoming drones may unload pods in loading bays in ascending order according to slot numbers of their respective loading bay dock as shown in FIG. 9. In some cases, drones may drop off pods at a transit bay instead of a loading bay if a passenger in a pod has this exchange station as their final stop. In another case, if a passenger is flying to their final stop after the present exchange station, the pod may be dropped off at a 1-pod drone bay to catch a drone to their final stop.

At step 1006, the drone descends on the first loading bay and unlatches from pods that are designated for drop-off at the present loading bay. At step 1008, after unloading of pods is completed at the present loading bay, the drone ascends to a safe flying altitude. At step 1010, if the drone is still carrying pods, the process may return to step 1004 and repeat steps 1004 to 1010 for as many different loading bays as necessary to drop off all pods. Once pod drop-off has been completed, step 1012 is reached, and a quick analysis is performed to decide whether the drone needs to be charged. If the power supply is at sufficient levels, the drone may be directed to park in a respective drone bay. In the case in which no other drone is available, the drone may be directed by exchange station manage control to a loading bay to pick up pods to fly to a next exchange station.

Returning to step 1012, if a charge is needed, step 1016 is reached, and the drone may be directed to a charging bay, and docks into an open spot to receive a charge. Step 1018 is reached when the drone has received a sufficient charge, which leads back to step 1014.

Figure 12A:
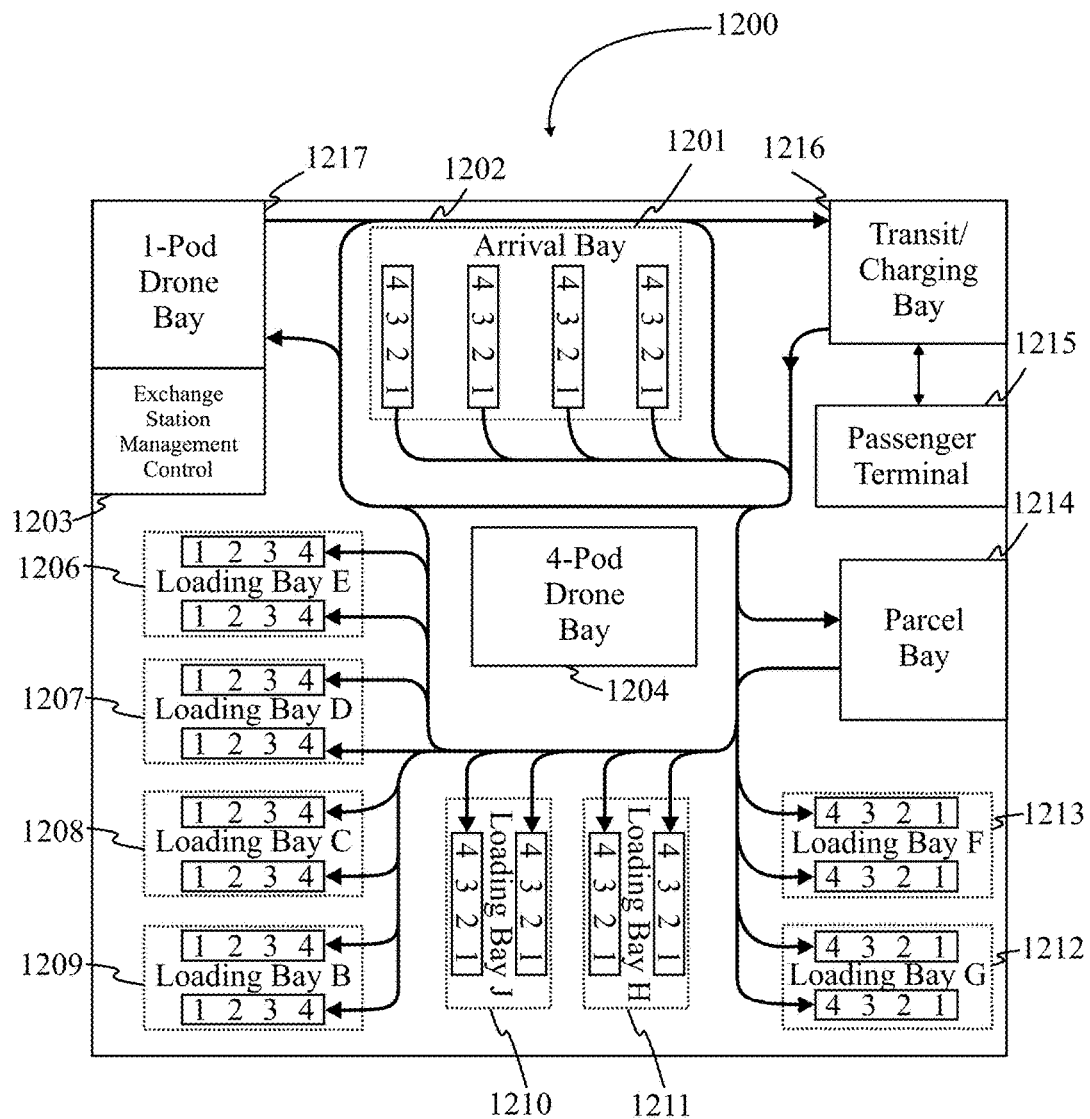
FIG. 12A is an illustration of an arrival bay exchange station 1200 according to one embodiment of the present invention.
Figure 12B:
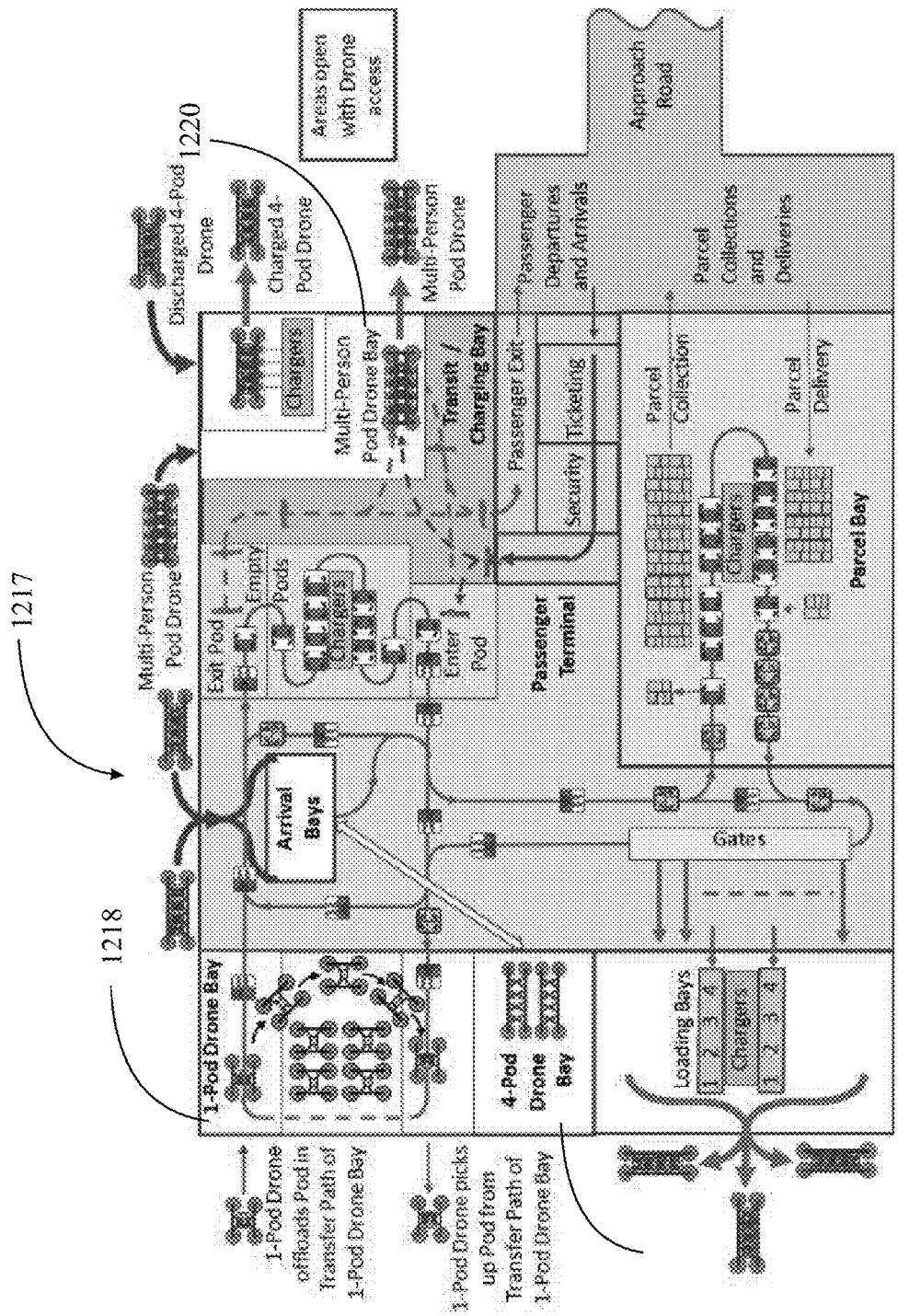
FIG. 12B is an illustration of an arrival-bay exchange station in another embodiment of the invention.

In another embodiment of the invention, pods waiting in loading bays may be charged there, and each loading bay pair will have a quad charger in this variation, similar to that in the charging bay. Charging will take a few seconds at most to fully charge. This is a convenient and fast way to fully charge a departing drone. Pod batteries if already partially charged, recharge until full then charging stops, so it doesn't matter if all four discharged pods have different charges. This is also valid for arrival bay exchange stations. Also for 1-pod drones departing, charging the pod batteries should be done in the 1-pod parking bay as shown in FIG. 12B. Pods may also be charged in the parcel bay. Control of drones throughout the process may be handled by communications between the controller of the drone, as explained above, and an exchange station management control system that may be present at all exchange stations.

Figure 11:
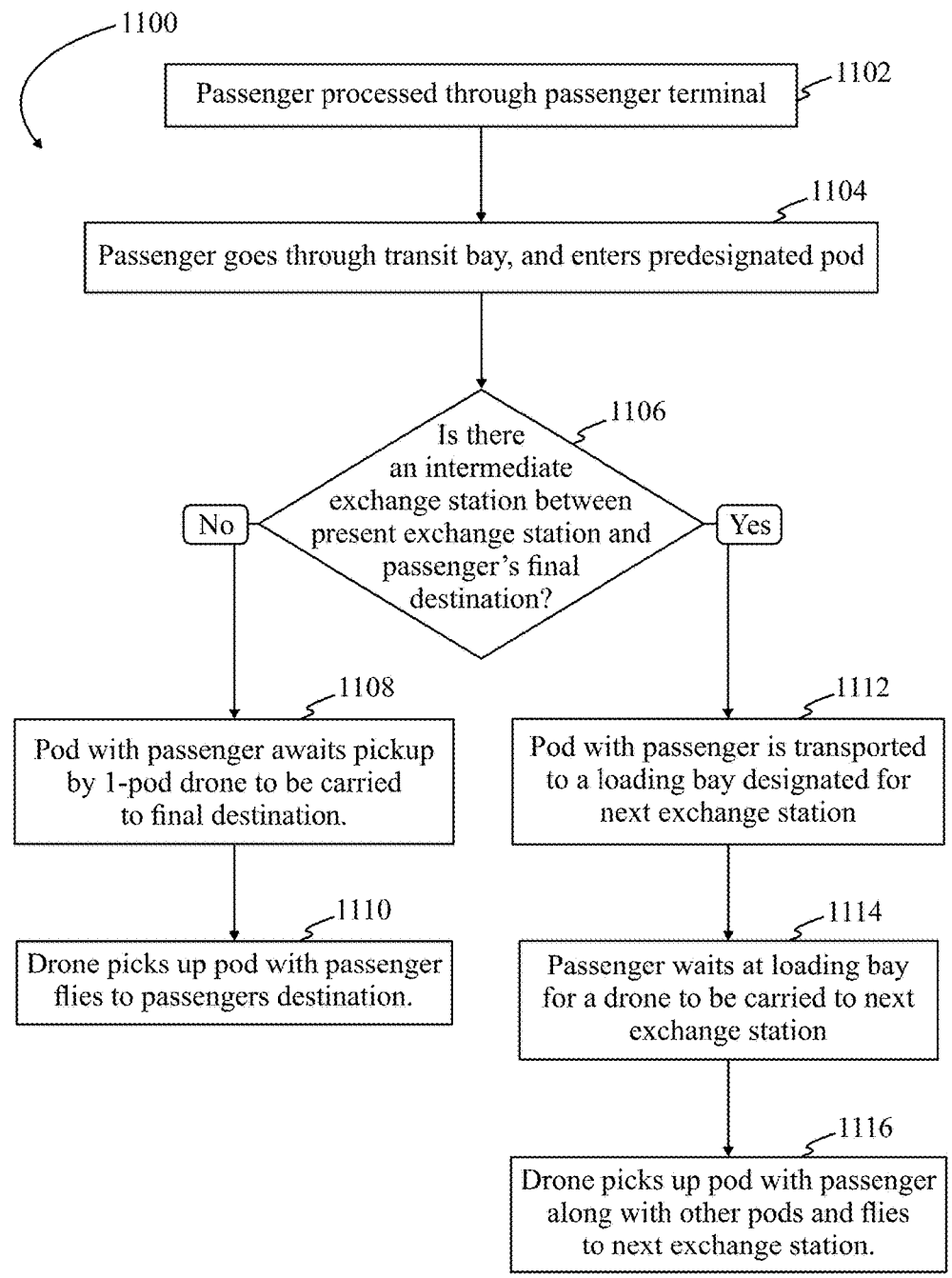
FIG. 11 is a flowchart of a method for new passengers entering a drone offload exchange station through a 1-pod drone bay or a passenger terminal according to one embodiment of the present invention.

FIG. 11 is a flowchart 1100 of a method for a new passenger entering a drone offload exchange station according to one embodiment of the present invention. The steps detailed herein are in the case of a passenger using a public pod, and may not cover the case in which a personal pod is used. At step 1102 a passenger is processed through a passenger terminal. Passenger terminals may be similar to those found at airports or train stations. Tasks completed at a passenger terminal may include, but may not be limited to, purchasing tickets, checking-in if tickets have been pre-purchased, or checking-in luggage. Once processed, step 1104 is reached, and the passenger goes to the transit bay, and enters a pre-charged pod designated to them during check-in or ticket purchase. At step 1106, if there are no exchange stations between the present station and the passenger's final stop, step 1108 is reached, and the pod carrying the passenger waits at the transit bay to be picked up by a 1-pod drone. At step 1110, the pod carrying the passenger is picked up by a 1-pod drone and carried to the passenger's final stop, and the drone and pod return to the same 1-pod drone bay.

Returning to step 1106, if there is a next exchange station on the passenger's itinerary step 1112 is reached, and the pod is transferred to a loading bay designated for the next exchange station. At step 1114, passenger waits for the loading bay to fill up with other pods, or a pre-established wait interval has passed. Other pods that may fill up a loading bay may be other passengers, or pods carrying parcels. If there are not enough parcel pods or passenger pods to fill up a loading bay, a brief wait time may be implemented to prevent unnecessary delays for passengers caused by waiting for the loading bay to fill up. As explained above, a 4-pod drone may carry any number of pods up to the maximum amount of 4 in this embodiment. At step 1116, a drone comes to pick up pods at the loading bay and flies to the next exchange station.

Arrival Bay Exchange Stations

For a higher volume of drone traffic, a more complicated exchange station type may be required. FIG. 12A is an illustration of an arrival bay exchange station 1200 according to one embodiment of the present invention. Exchange station 1200 may have features and structures that may be found in a drone offload exchange station 900, such as, a 1-pod drone bay 1217, an exchange station management control post 1203, a transit and charging bay 1216, a passenger terminal 1215, a parcel bay 1214, a 4-pod drone bay, and a plurality of loading bays 1206 to 1213. Also, similar to drone offload station 900, arrival bay exchange station 1200 in this embodiment illustrates eight loading bays with a pair of docks, but it should be understood that more or fewer loading bays may be used, space permitting, and the number of docks may also be adjusted depending on usage need. The major difference, regarding features, between arrival bay exchange station 1200 and drone offload exchange station 900 may be the presence of an arrival bay 1201, and a transfer path 1202 used for transferring pods around the exchange station.

Incoming drones descend onto an available dock in arrival bay 1201 selected by an exchange station management control system 1203 and unlatch from carried pods. In this embodiment, four 4-pod drones may offload pods simultaneously in any of the four arrival bay docks of exchange station 1200. The emptied drone then takes off and may be directed to either pick up pods at a waiting, loaded, loading bay to fly to a next exchange station, or, if none are waiting, to a 4-pod drone bay 1204 where they may be on standby to be activated to pick up pods at a waiting loading bay. The offloaded pods are then individually and automatically carried along transfer path 1202 to their target loading bays. The path from arrival bay to loading bay may be as fast as the exchange station requires. For example, larger and busier exchange stations may need a faster transfer rate to cut down on wait time for incoming drones and pods.

Once an incoming drone has taken off from the arrival bay 1201, the pods may be shifted forwards out of arrival bay 1201 onto the transfer path 1202. The occupants may face their direction of travel down the transfer path which may minimize discomfort during pod transferring. Once the pods have left arrival bay 1201 they then are guided by open and closed gates or some other method to a target loading bay.

The pods may use an on-board collision avoidance system to indicate to its own controller that ensures a safe distance is maintained from either the pod in front, or from a pod joining the path. It is likely the local exchange station management control 1203 may also be involved in ensuring safe conditions are maintained. There are a variety of arrangements that may be incorporated to facilitate movement of pods along transfer paths. In some cases, the pods may have wheels, which may or may not be retractable. In other embodiments, there may be rails similar to narrow gauge trains, and the pods may be enabled to ride on the rails and be gated through intersections along the transfer paths. In some embodiments, pods may be self-powered, and in others, there may be means external to the pods to move the pods along the transfer paths.

This embodiment utilizes an architecture designed so that no transfer path crosses another, which allows for the terrain to be flat, as well as to minimize delays. It may be good planning to have arrival bay 1201 on slightly higher ground so that gravity can be utilized to assist in guiding pods to a respective target loading bays further down a slope, similar to a bobsleigh ride.

Once a loading bay has one last pod incoming to fill it or a pre-established wait time has passed, and in either case the pods are fully charged, an empty drone from 4-pod drone bay 1204 takes off and flies to above the present loading bay. The empty 4-pod drone descends to the pods, latches onto them and ascends, flying on to the designated next exchange station.

In addition, passengers may enter exchange station 1200 via passenger terminal 1215, where after being processed through passenger terminal 1215, they are led to transit bay 1216. The passenger enters a designated pod and may be transferred by transfer path 1202 to a target loading bay, or may be taken by a fully charged pod from the transit bay to 1-pod drone bay 1217, where a 1-pod drone may transport the passenger to the next exchange station, or final destination. Fully charged parcel pods may also transfer by transfer path 1202 to a target loading bay. At all times the pods and drones may be under the control of exchange station management control 1203.

With four arrival-bay docks active, there may be sixteen pods traveling from their arrival bay docks to their target loading bays along transfer path 1202. This total does not include pods that may be entering from parcel bay 1214 or 1-pod drone bay 1217, or the transit bay 1216. It should be understood that a busier exchange station may need more arrival-bay docks, so it is well within the scope of the present invention to scale exchange station 1200 and utilize as many arrival-bay docks, and loading bays as needed to cut down on backlog and maintain efficiency, and vice versa if a smaller exchange station is required.

FIG. 12B is an illustration of an arrival bay exchange station 1217 with expanded functionality and flexibility over that described for the exchange station of FIG. 12A. The exchange station of FIG. 12B has at least one 1-pod drone bay 1218, at least one 4-pod drone bay 1219, and at least one multi-person pod drone bay 1220, with pods as seen in FIGS. 6A and 6B. Note FIG. 12B shows a common point of entry for 4-pod drones from the top, whichever direction they may came from. This is to avoid collisions.

In addition, FIG. 12B shows multi-person pods arriving at and departing from the transit bay, where passengers can enter from or exit into the passenger terminal or enter into or exit from the 1-pod drone bay or enter into the transfer path to a loading bay or exit from a transfer path to an arrival bay. The multi-person pods may be charged while in the transit bay by chargers next to the charging bay.

In addition to differences and functions described above, FIG. 12B shows integration of an approach road with portals for arrival and departure of passengers, and for arriving and departing parcels.

In addition, FIG. 12B shows battery chargers that will charge four pod batteries simultaneously in the charging bay, the transit bay, the parcel bay and between each pair of loading bays, to ensure a quick and convenient way of ensuring only fully charged drone exit the exchange station. But also, 4-Pod Drone batteries will sometimes have a need to be charged, and this may be done in the 4-Pod Drone Bay by a smaller charger, and 1-Pod Drones in the 1-Pod Drone Bay by an even smaller charger, with both possibly using the same receptacle as the 1-Pod chargers.

Figure 13:
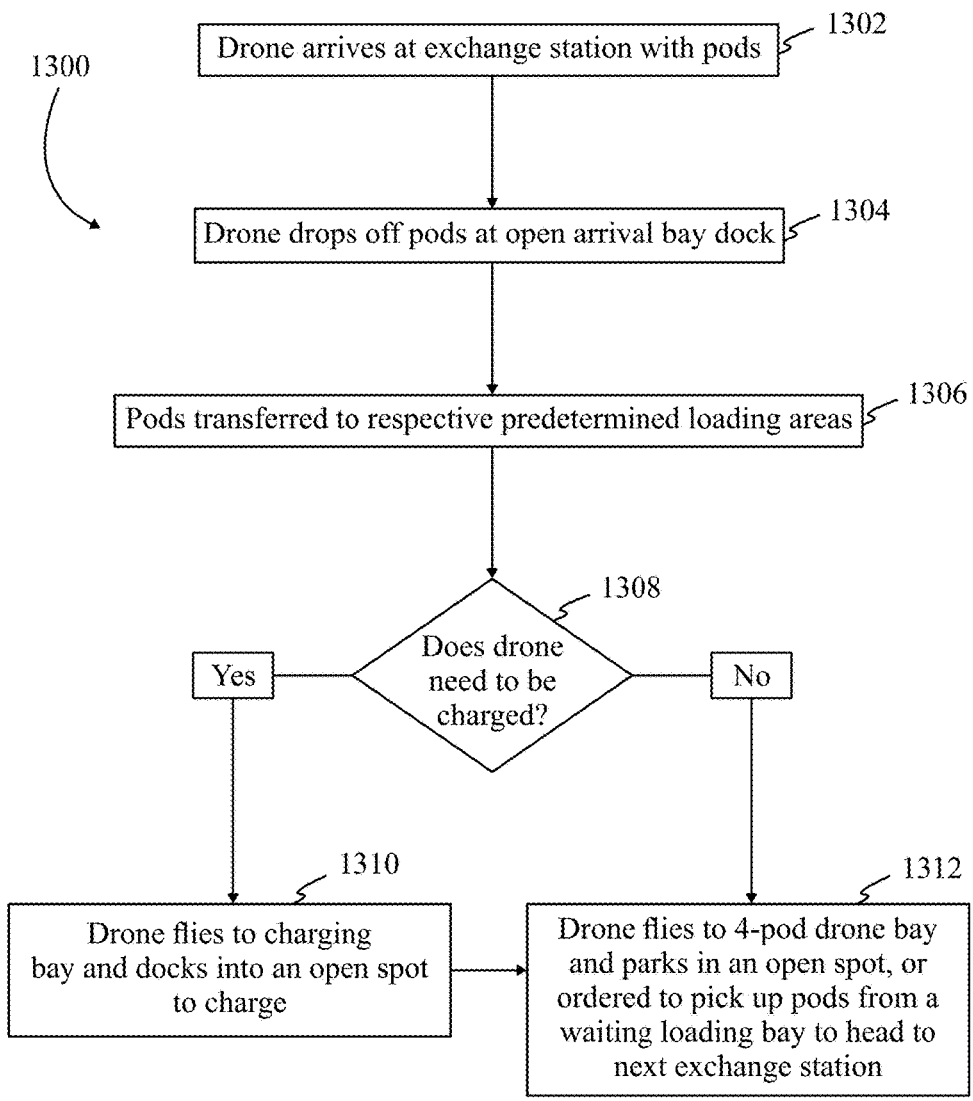
FIG. 13 is a flowchart of a method for arrival, unloading, and transferring of a 4-pod drone carrying pods according to one embodiment of the present invention.

FIG. 13 is a flowchart 1300 of a method for arrival, unloading, and transferring of a 4-pod drone carrying pods according to one embodiment of the present invention. At step 1302, a 4-pod drone carrying pods arrives at an arrival bay exchange station. The 4-pod drone may be carrying between 1-4 pods in this embodiment. At step 1304, the drone flies to an open arrival bay dock and drops off all the pods it is carrying. At step 1306, the pods are transferred via transfer paths to each pod's respective designations. For example, a pod flying to a final stop may be transferred to a 1-pod drone bay to catch a drone to the final stop, while a pod with parcels may be transferred to a parcel bay for processing, or a pod heading to another exchange station may be transferred to a designated loading bay. Or a passenger departing the exchange station will exit their pod in the transit bay and exit via the passenger terminal.

After the drone drops off all pods at the arrival bay, step 1308 is reached, and an analysis of drone power level is done to see whether the drone needs to be charged. If power levels are not sufficient, step 1310 is reached and the drone flies to a charging bay and docks into an open spot to charge. After charging, step 1312 is reached. If there are no drones ready to transport waiting pods, the drone may be directed to a 4-pod drone bay to park itself in an open spot. Otherwise, the drone may be ordered by exchange station management control to pick up fully charged pods from a loading bay to transport to a next exchange station. Returning to step 1308, if a charge is not required, step 1310 is skipped, and step 1312 is reached directly.

In alternative embodiments, chargers may be provided in different bays in the station, and charging may be done, as described above, for example, in loading bays.

Figure 14:
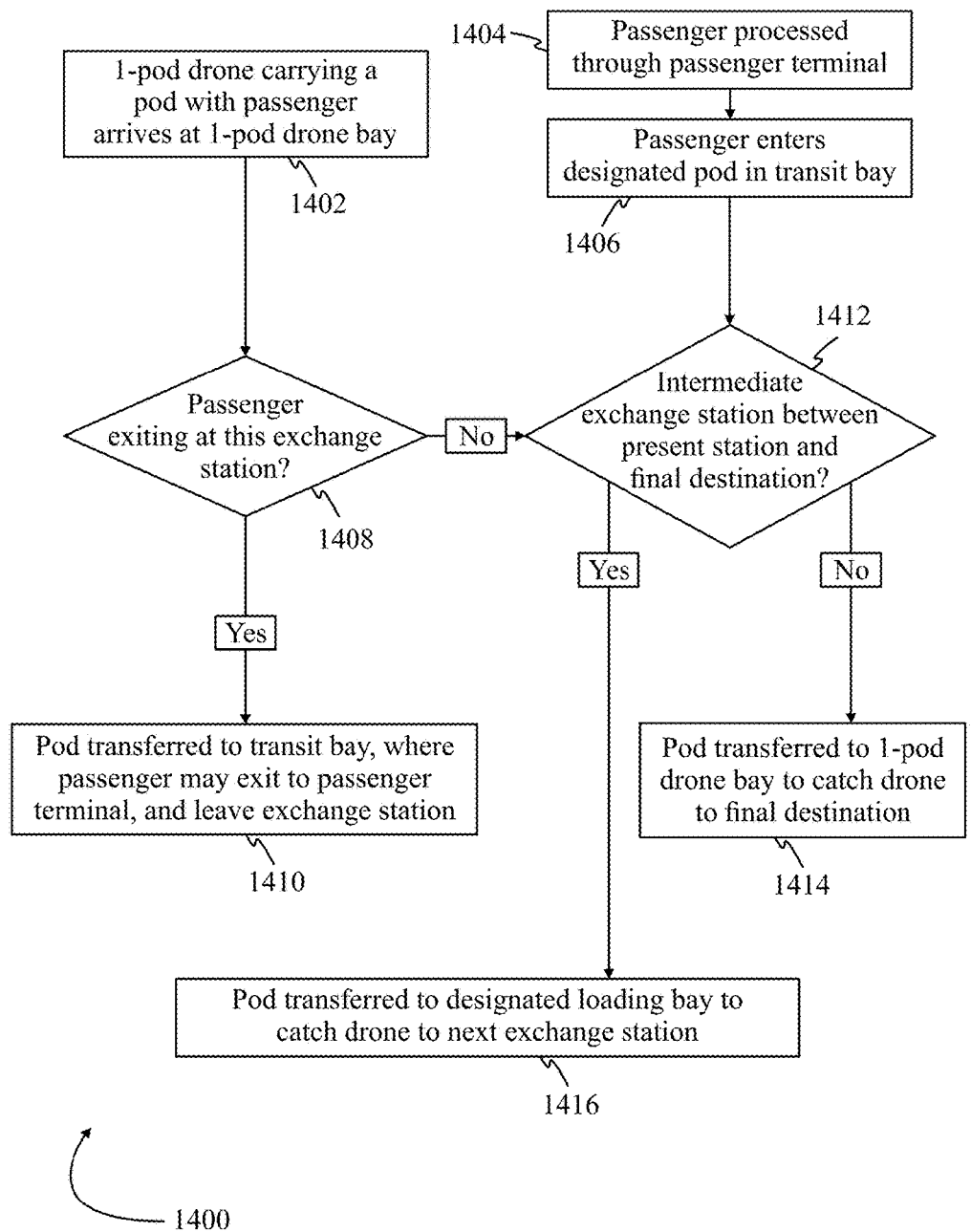
FIG. 14 is a flowchart of a method for passenger pods entering into an arrival bay exchange station system from sources other than the arrival bay according to one embodiment of the present invention.

FIG. 14 is a flowchart 1400 of a method for passenger pods entering into an arrival bay exchange station system from sources other than the arrival bay according to one embodiment of the present invention. At step 1402, a 1-pod drone may carry a pod with a passenger from areas such as shopping, home, or office to a 1-pod drone bay at the present exchange station. At step 1408, if a passenger is leaving the present exchange station, step 1408 is reached, and the pod may be transferred to a transit bay where the passenger may exit the pod and may exit the exchange station through the passenger terminal. Returning to step 1408, if the passenger is headed to a different exchange station, step 1412 is reached. At step 1412 if there is no intermediate exchange station between the present exchange station and final stop, step 1414 is reached. At step 1414, the pod may wait at the 1-pod drone bay for a drone to transport it to the final stop. Returning to step 1412, if there are one or more intermediate exchange stations, step 1416 is reached. At step 1416 the pod is transferred to a loading bay heading to the passenger's next exchange station.

On the passenger terminal side, which may be occurring simultaneously, at step 1404 a second passenger is processed through the passenger terminal. At step 1406, the second passenger may enter a fully charged pod in the transit bay designated to them during processing in the passenger terminal. After which, step 1412 is reached. At step 1412 if there is no intermediate exchange station between the present exchange station and final stop, step 1414 is reached. At step 1414, the pod may be transferred to the 1-pod drone bay to catch a drone to transport it to the final stop. Returning to step 1412, if there are one or more intermediate exchange stations, step 1416 is reached. At step 1416 the pod is transferred to a loading bay heading to the second passenger's next exchange station. For parcel pods, a pod from a parcel bay may enter the transfer path and be transported to a designated loading bay at any time, or to the 1-pod drone bay to be transported to an office or residence.

Figure 15:
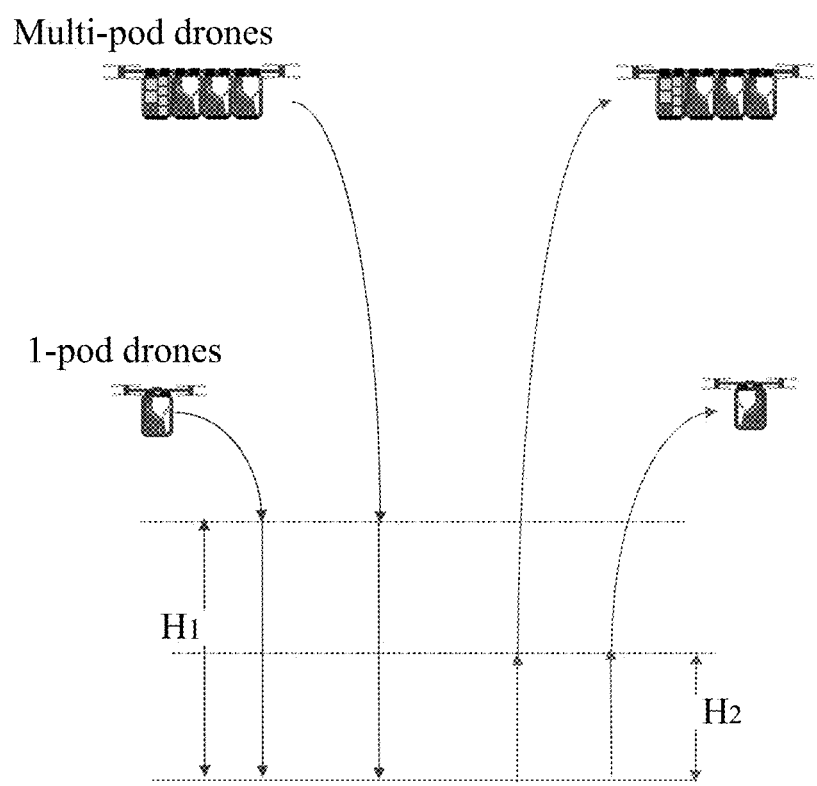
FIG. 15 illustrates preferable operating altitudes for drones relative to exchange stations.

FIG. 15 illustrates preferable operating altitudes for drones relative to exchange stations. Exchange station control checks arriving 4-Pod or 1-Pod drones for routing information to verify Pods should be landing at a particular exchange station. If not, or if a Passenger wishes to change route mid-flight, that Pod will instead transfer out of arrival bay into the transit bay, where it is re-programmed and transferred via a transfer path through transfer path to the new target loading bay.

Height H2 is minimum height to clear all ground obstacles. This is height drones must attain ascending vertically, then drones may stop climbing vertically and begin to travel towards destination. H1 is height above ground when descending drones start to descend vertically to ground. Heights H1 and H2 are initial safety heights to clear the Exchange Station. Once clear, the drones may ascend to their traveling altitude in their directed droneways, the height depending on their direction.

It will be apparent to one with skill in the art, that the embodiments described above are specific examples of a single broader invention which may have greater scope than any of the singular descriptions taught. There may be many alterations made in the descriptions without departing from the spirit and scope of the present invention.

Self-Navigating Pod-Chassis Assemblies

Figures 16A, 16B:
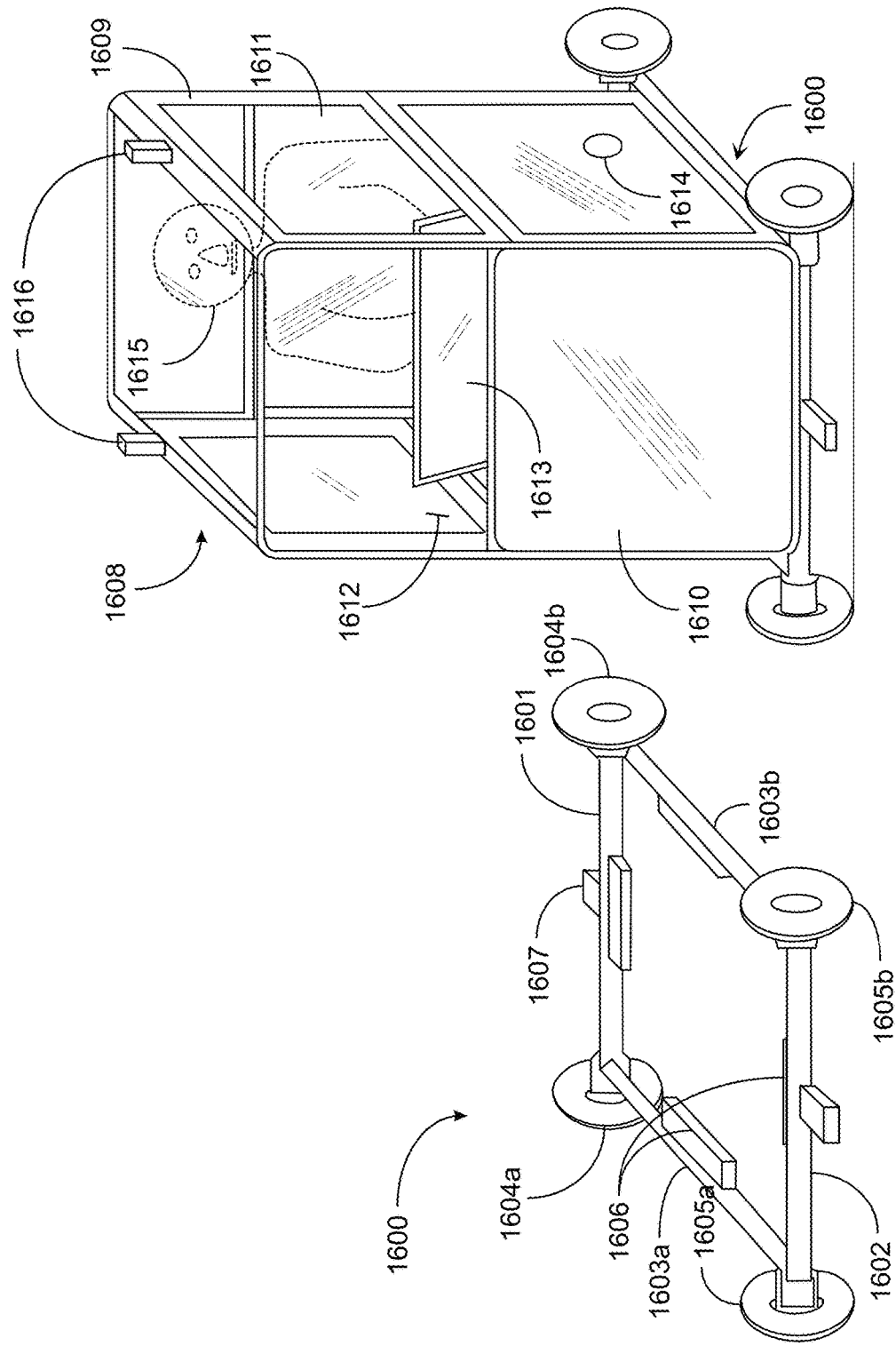
FIG. 16A is a perspective view of an intelligent pod chassis according to one embodiment of the present invention.
FIG. 16B is a perspective view of a passenger pod seated and latched to the chassis of FIG. 16A.

FIG. 16A is a perspective view of an intelligent pod chassis according to one embodiment of the present invention. FIG. 16B is a perspective view of a passenger pod seated and latched to the chassis of FIG. 16A. Referring now to FIG. 16A, a pod chassis 1600 is provided by the inventor to enable a passenger or a parcel (freight) pod to be seated thereon and latched thereto, such that the chassis may drive the pod under remote control from and to one or more control stations, or by overriding control by a human operator on the ground or by a passenger sitting in the pod.

Chassis 1600 in this exemplary embodiment includes a frame incorporating a rear axle 1601, a front axle 1602, and a pair of fixed side struts 1603a and 1603b. Each of the axles supports a pair of drive wheels 1604a and 1604b attached to rear axle 1601, and drive wheels 1605a and 1605b attached to front axle 1602. In one implementation, there are four motors (not specifically illustrated) provided one each per wheel, wherein the chassis is an all-wheel drive, or each wheel may be powered by a single motor. Motors may be co-located next to each drive wheel and may be housed within each of the axles.

In the above implementation, smaller motors or other actuators may be provided to enable control for turning of at least the front wheels. The front wheels may be linked in tandem such that two servo motors may control turning, one motor for turning right and one motor for turning left. The servo motors (not illustrated) may be co-located next to drive motors within the front axle and may control movement of the turn linkage connecting the wheels through the axle. There are a variety of ways that turning may be accomplished.

Chassis 1600 includes in this exemplary embodiment inwardly-facing latches 1606 that accept and latch onto the bottom frame of a pod. Chassis 1600 may also include a small rechargeable battery and a small computing processor unit (CPU) including a wireless modem for remote control and power lines to power the motors. Power connectors are integrated into latches 1606 that connect to terminals in the interface hardware of the pod so that the chassis may be powered by a larger pod battery. Hosting electronics and a smaller battery in the chassis frame enables the chassis to be remotely driven with or without a pod, such as for parking or positioning for pod installment. However, in one implementation the chassis may be a dumb chassis until a pod is attached. In this implementation, power cables and control signal lines may be routed through the latch connections from the pod battery and control module to the motors.

Chassis 1600 may include outwardly-presenting tongue latches 1607 to enable several chassis to be linked together linearly. In a further implementation, chassis may also have outwardly-presenting tongue latches (not illustrated) at the center of each side strut so that they may be connected laterally such as four chassis two side-by-side in front and two side-by-side behind.

In a preferred implementation chassis 1600 includes a plurality of sensors, such as a combination of or single technology grouping of proximity sensors, cameras, lidar sensors, and infrared sensors. These sensors may be disposed along the front and rear axles and along the left and right struts of chassis 1600. Wiring from deployed sensors may be routed through the axles and struts to the CPU and through latches 1606 to a control device on the pod (a separate CPU), such that remote control of the chassis may be initiated through a module on the pod architecture. Further, such bridging may be made through drone to pod attachment interfaces as described above referencing the description of FIGS. 3A, 3B, 3C, and 4.

In a preferred embodiment, the sensors work in conjunction with a controller and command instruction including GPS location information to enable the chassis to self-pilot within a building such as an exchange station or out on a street or pathway. Also in this embodiment at least two upper limit latches 1616 may be provided to accept drone latches. It is noted herein that the pod described above includes as many as four latches for drone hookup, in addition to the latches for connecting to a chassis. In this example there are two such latches one at each side of the pod.

Referring to FIG. 16B, a pod 1608 is provided somewhat analogous to pod 100 described with reference to FIGS. 1A-C. Pod 1608 may be seated onto chassis 1600 and latched thereto enabling the chassis to drive the pod both inside and outside of designated buildings that may be exchange stations, charging stations, etc. Chassis 1600 enables passengers, referenced herein as a passenger 1615, to proceed from an exchange station on to a workplace or other destination making the transport system complete and relieving drones of a requirement to fly the pods to final destinations or picking them up from original starting locations.

It is an important aspect of the present invention in many implementations that pods are standardized and are compatible for engagement and transport by either intelligent, wheeled chassis, as described herein, or by pickup and transport by flying drone as described in enabling detail above.

There are a variety of ways a pod may be moved to and mounted on a chassis. For example, a pod may be picked up by a drone, and lowered to and engaged to a chassis. Pods may be suspended as well from some other apparatus, and a chassis may drive under the pod, with the apparatus lowering the pod to the chassis. In another variation the chassis drives under the pod and slides it along over small rollers in the struts. In some embodiments, windows of pods may be covered by a computer-generated display, for games or movies using AR/VR technology.

As describe previously, in one embodiment pod 1608 includes at least one door 1609, a front panel 1610, a rear panel 1611, a roof and a floor and three or more windows 1612. Windows may be fabricated of plexiglass, automotive window glass, or of other suitable transparent materials. In one embodiment, windows 1612 may include coatings or materials that provide UV protection for passengers and tinting for passenger convenience.

In one implementation each pod has at least one CPU controlled display and an input interface for passenger use and for technical access to pod chassis components. Each pod has a battery that may be the primary battery powering drones or chassis when either is engaged in carrying one or more pods. The pod battery (not illustrated) may reside beneath the passenger bench. A charging access port to the battery is provided at least on one side of the pod passenger seat and is designated by an access relief opening 1614 made through the panel of door 1609, that aligns with a charging port built into the passenger seat when the door is closed.

Figure 17:
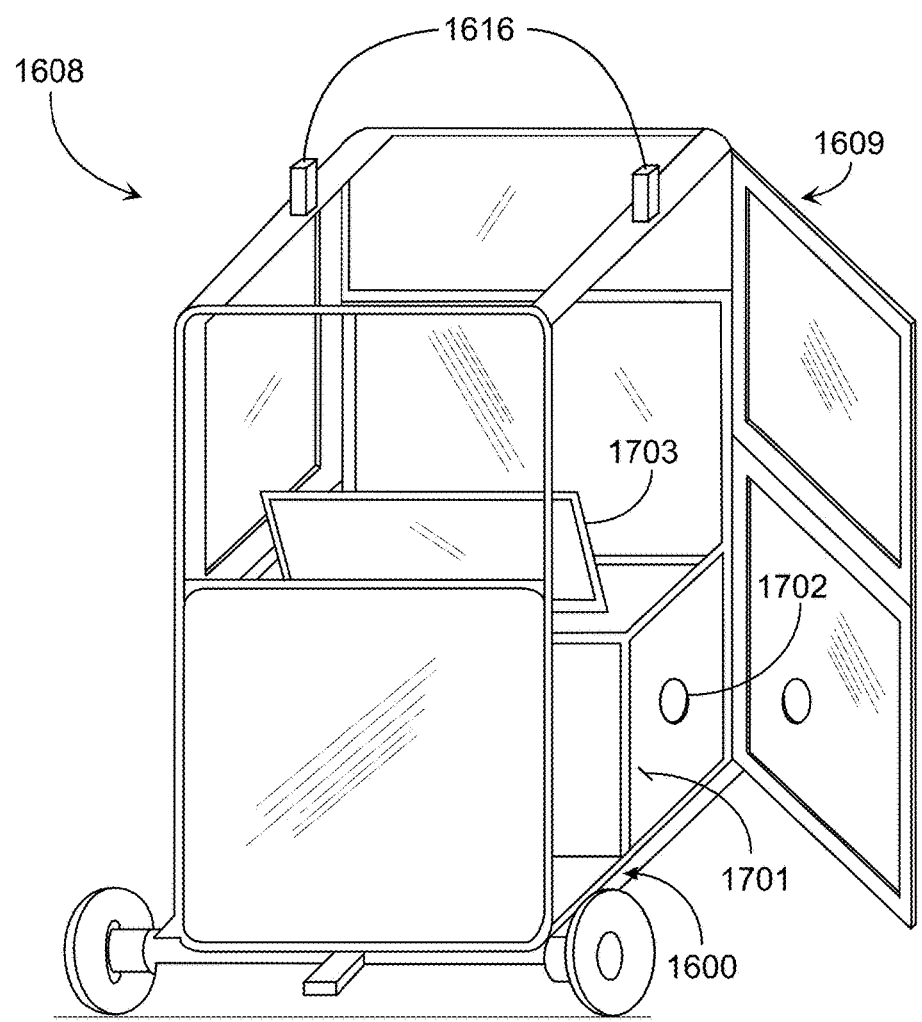
FIG. 17 is a perspective view of a pod with an open door.

FIG. 17 is a perspective view of pod 1608 and carrier chassis 1600 of FIG. 16B showing the pod with an open door, to better illustrate other elements of the pod, such as charging access port 1702 through bench seat 1701, which, in freight configurations may be a battery cover rather than a seat. In this view door 1609 is open to enable passenger ingress and egress or loading or unloading of parcels. In one implementation where the car delivers parcels there is no passenger seat or bench, but a cover for the battery. Parcels may be loaded into a shelf type encasement that may be unlocked using a code provided to a parcel recipient by the retailer or company shipping the parcel.

A code, for example, might be used by an intended parcel recipient to open door 1609 and then to open a compartment of the parcel shelf to retrieve the correct parcel. In other implementations parcels may simply be stacked for general shipment to a drop off point or shipping station where they may be unloaded and sorted for local delivery by mail truck, UPS, or another carrier. In one implementation a passenger may override automated navigation and drive the chassis through a computerized display interface 1703 that accepts passenger input. Steering, braking, and speed selection may be affected manually through operation of the display interface via touch screen controls, for example.

In this implementation there are only two drone latches 1616 on top of the car. However, there may be other architectural patterns of latches and the exact mechanics of latch hardware may vary depending upon design. Latches may be magnetized and coupling to a drone may be initiated by drone control instructions. When a drone latches onto pod 1608, it may then switch over to draw power from the pod battery. The chassis may be released for use by a next arriving pod. Chassis 1600 may also be driven without the pod attached.

It may be important to note here that drones are controlled by a portion of the navigation system to pick up pods, transport them, and to release them at programmed locations. Pods on chassis may be controlled by the same navigation system or by a separate system than the drones without departing from the spirit and scope of the present invention.

Figure 18:
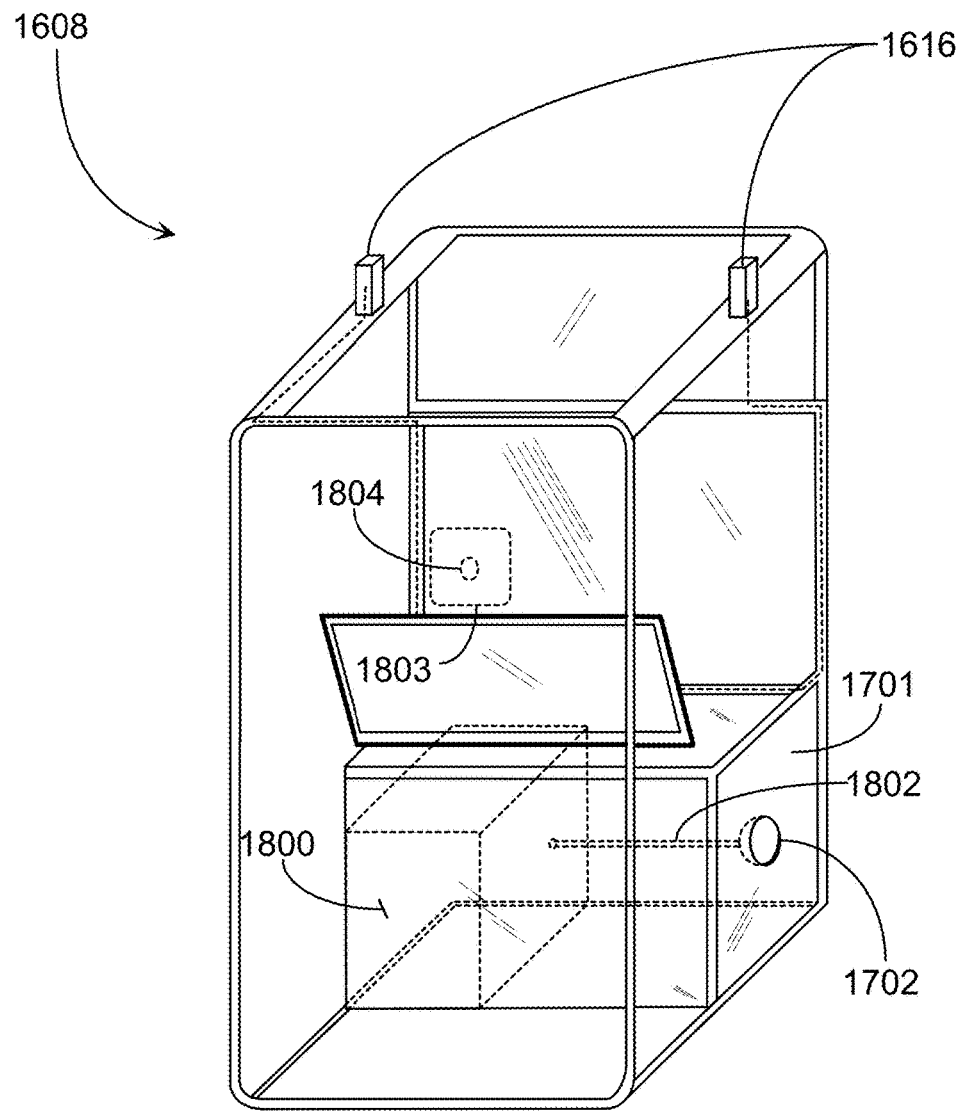
FIG. 18 is a perspective view of the pod passenger carrier of FIG. 17 with exterior doors and panels removed depicting inner components.

FIG. 18 is a perspective view of passenger pod 1608 with exterior doors and panels removed to better illustrate inner components. Pod 1608 in this embodiment includes a primary rechargeable battery 1800 located beneath passenger seat 1701. The battery size may vary, and the battery may be located anywhere within the passenger seat box. Battery 1800 is accessible for charging through a charge port 1702 and charge line 1802 connected between the port and the battery. Battery 1800 may also power a drone through latch points 1616.

Power lines from the battery are illustrated by dotted lines extending up through the pod architecture to the drone latches. An electrical contact seat is formed between the pod and drone at the latch architecture, enabling the pod battery as a source of power for the drone. Power lines from the battery may also extend below the pod floor into the pod chassis through a plug connection or automatic coupling hardware. In one embodiment, while a pod is seated in a chassis and or a drone is attached for flight, the computer processing may be assigned to any one of three CPUs, these being the chassis CPU, the drone CPU or the Pod CPU, to avoid computing redundancy. In one implementation, pod 1608 may have a rechargeable auxiliary battery 1803. Battery 1803 may be mounted to or otherwise fixed to pod 1608 for charging, and a charging port 1804 may be provided and dedicated to charging battery 1803 from outside of the vehicle. Battery 1803 may be used for auxiliary purposes such as powering lights, a music device, or for emergency purposes such as emergency flashers, and so on. In one case, a passenger may switch to auxiliary battery power, such as when waiting for a primary battery to be fully charged, wherein electronics in the pod, such as a computing and display interface, are not able to draw power from the primary battery.

Pod 1608 may include other features not specifically illustrated, such as heating and air conditioning, emergency collision air bags, adjustable windows, vents, safety locks for doors, and other such features. Individual ones of these features may be initiated or otherwise manipulated by a human passenger and individual ones of these features may be fully automated upon trigger alert or otherwise initiated because of detection through sensors or communication or passenger input that an emergency is unfolding. IN control systems, functionality like Alexa and gesture recognition may be implemented.

FIG. 19A is a perspective view of a train of pod chassis, joined in a series. FIG. 19B is a perspective view of a group of pods on chassis, linked to travel in line together. Referring first to FIG. 19A, a chassis train 1900 of four chassis, analogous to chassis 1600 of FIG. 16A above, are shown linearly attached via tongue latches analogous to latches 1607 depicted in FIG. 16A.

In one use-case scenario, multiple chassis may be linked together to form chassis trains such as train 1900 for receiving four pods analogous to pod 1608 of FIG. 16B, that may be delivered by drones, such that the spacing between the pods attached to a four-pod drone, and the spacing of seat latches 1606 are sufficiently the same and within tolerance to affect 100 percent latching of each chassis to a pod. There may be chassis trains of two chassis, three chassis, four chassis, etc. When chassis are connected, control and power lines of each chassis may be connected through the latching hardware, such that the lead chassis may become a parent chassis and may override certain functions of the other chassis. More particularly, a functional network is created including the separate nodes being the chassis CPUs and the reporting sensors.

In one implementation, chassis may be remotely piloted and latched together as well as disconnected from the train remotely by a human operator or auto-pilot instruction. While not connected in a train, each chassis may be separately remotely operated to drive to designated locations for maintenance, storage, staging, etc. While connected into a train, the lead chassis may be operated as the intelligent chassis for navigation purposes, such as the turning capabilities of the chassis further back in the train being overridden by the lead chassis, whereas the motors on all the chassis may remain active in driving the train forward.

In one embodiment, a train of pods carrying passengers on chassis may proceed along a route wherein one or more of the passenger pods must depart from the train along a different route. In such cases, the train may stop and the pod requiring rerouting may unlatch from the train and embark on its own while the remaining pods on chassis re-latch to continue along the primary route.

Referring now to FIG. 19B, in one embodiment multiple separate chassis may be commanded to navigate from separate locations to a single location and form a chassis train for receiving a like number of pods. Each chassis may have a unique IP address or machine address for identification by commanding SW. Chassis train 1900 includes four chassis in this example and carries four pods 1608. In one embodiment, all four pods may be placed onto chassis train 1900 by a drone at the same time and in the same programmed action. In another embodiment, pods may be separately delivered to a chassis train by successive single-carrier drones. Optical and proximity sensors on the pods and on the chassis may aid in proper seating and latching of the pods to the chassis.

FIG. 19C is a perspective representation of a compound chassis in another embodiment of the invention. In the circumstance represented by FIGS. 19A and 19B, four separate chassis are linked together to carry four separate pods. In FIG. 19C, a single chassis 1901 is provided and enabled to carry either four separate pods, or in another circumstance a single pod developed to carry four passengers. FIG. 19D illustrates four pods carried on a single chassis 1901.

Chassis 1901 in this example has axles and wheels just on the ends of the length of the chassis. Both sets of wheels may be powered and may be controlled to steer. There are, in this example, latching supports 1902 for accepting and supporting separate pods or a multiple-passenger pod. Pods latch to supports 1902. Cross members 1903 are provided to strengthen the chassis structure.

Given the figures and description herein, it should be apparent to the skilled person that carriers may be designed and provided to carry single pods, and single pods in arrays, as well as to carry multiple-passenger pods, wherein passenger compartments may be arranged in essentially the pattern that single pods would follow for a particular carrier.

Given the descriptions above regarding exchange stations, it is important to understand that passenger pods as described being carried by drones from above, and passenger pods being carried by intelligent chassis carriers, may be exchanged from one carrier to the other in exchange stations, such that a passenger in a passenger pod may be at different times transported by a chassis carrier or a drone, and theoretically, any number of exchanges may be made without a passenger required to leave one pod for another. A passenger, once in a pod, may stay in the same pod throughout a journey, regardless of exchanges in mode of transport.

POD Charging

Figure 20:
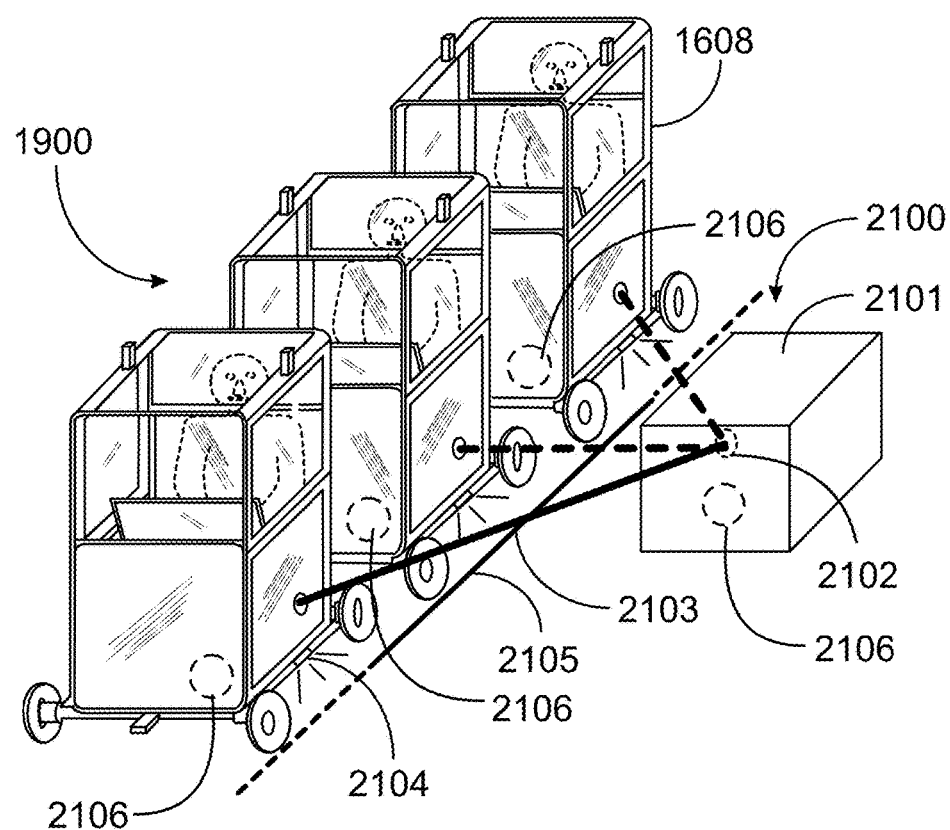
FIG. 20 is a perspective view of a charging bay where charging occurs via mechanized charging cable according to one embodiment of the invention.

FIG. 20 is a perspective view of a charging facility 2100 where charging occurs via one or more mechanized charging cables according to one embodiment of the invention. Charging facility 2100 may include a charge terminal 2101 having at least one charge cable 2103 extending from a terminal outlet 2102 that may connect to a charge port on a pod 1608.

Charge facility 2100 may be guided as far as charge position and speed by a physical charge line 2105, in one embodiment embedded in a floor structure, that can be detected by side-presenting sensors 2104, which may be lidar or infrared, or optical, or a combination of these, one of which may be a camera. A cable or cables 2103 may be mechanically operated and may adhere to an extension limit. The charge plug, or terminal end of a charge cable, such as cable 2103, may include at least one sensor for detecting position of a pod for charge.

In one implementation the charge cable has a maximum and a minimum extension range that covers a rough 45-degree articulation range of the cable. For example, if a single pod on a chassis uses the facility, side-presenting sensors 2104 may detect line 2105 and may provide feedback to the navigation module to align with that line for charging, including adjusting the speed of movement to a speed conducive to receiving a full charge within the range of the cable. Therefore, a pod 1608 approaches line 2105 and slows down to charge speed and proceeds along the line until in position for cable connection at the cables maximum extension at forty-five degrees from center (first dotted cable line position).

As the pod moves forward along the charge line, the cable is connected and charging is accomplished, and then the cable automatically retracts to minimum extension distance roughly at center (second dotted cable line position). The pod car proceeds along the charge line to the maximum extension again at the end of the forty-five-degree range within which charging may occur. At this point the charging is complete and cable 2103 may decouple from the charge port and may be maneuvered to accept a next pod car for charging.

In an embodiment with more than one cable, a train 1900 (three or more pods latched linearly) may be charged while still latched together wherein three or more mechanized cables are made available, one for each pod in the train. In such an embodiment the dotted cable lines may represent additional cables 2103, one for each pod in the train. In this case the lead pod is fully charged and about to be decoupled from the charge cable while the next pod is at mid charge and the pod further behind has just been coupled to a charge cable.

The mechanics required to manipulate and direct the charge cables may vary. For example, a cable may be housed in a telescopic sheath that may be connected to a turret component that may enable the cable to be swiveled along the forty-five-degree angle defining the charge area. There may be more than one connected to an outlet on charge terminal 2101. One with skill in the art may appreciate that protective covers and components may be employed to reduce chance of shock or accidental short without departing from the spirit and scope of the invention. Drones are charged separately in different charging. Once a drone latches to a pod, the drone may switch over to main pod battery for power.

Pods seated on a chassis may be charged at a facility such as facility 2100 with or without passengers on-board and with or without parcels on-board. In one embodiment, wherein a passenger is present during charging, the system may enable a power source change for the pod from the primary battery under the seat to an auxiliary battery mounted or otherwise integrated into the pod structure. In another case a passenger may continue to operate pod features normally sourced by the primary battery during charging.

In calculations regarding a mechanized cable, the inventor has deduced that, for example, if the retracted charge cable length is five meters, and engagement of the charge plug, and disengagement occurs at plus forty-five degrees and minus forty-five degrees from center (retracted position), total distance of travel is 10 meters. The actual speed for charging may vary depending in part on the pod battery size and density, as well as the power level of the charge station.

Figure 21:
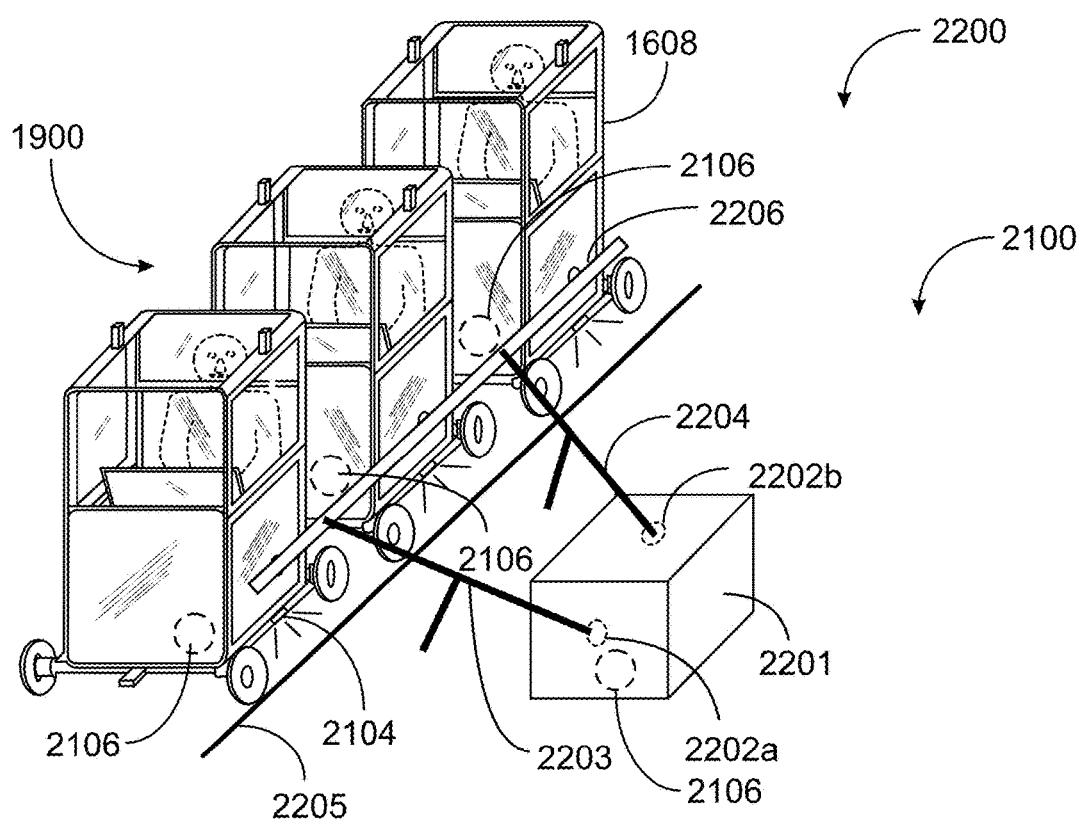
FIG. 21 is a perspective view of a charging bay where charging occurs via a fixed rail according to another embodiment of the invention.

FIG. 21 is a perspective view of a charging bay 2200 where charging occurs via a fixed rail according to another embodiment of the invention. In one implementation, charging bay 2200 is provided with a charge-guide line 2205 that may be picked up by side-presenting sensors 2104 as was described with respect to the charging bay of FIG. 20. In place of cables, charging bay 2200 utilizes a charge rail 2206 that may be fixed at the end of a pair of structurally supported charge extensions 2203 and 2204. The other ends of extension or cables 2203 and 2204 culminate at charge terminals 2202a and 2202b respectively in the example.

In this implementation, a single pod 1608 or a train of pods cars 1900 may be charged by making contact between the charge port on the side of the passenger bench and the fixed rail, such as by a brush mechanism that may remain in contact with the charge rail while the pod car or train is moving forward. In another implementation a fixed charge pad or series of pads might be used in place of a fixed charge rail, wherein a pod or pod drives directly over the pad(s) and a wireless power transfer to a charge receiving unit at the bottom of the pod battery occurs as the pod car moves over the charge pad(s).

Sensors may detect a charge guide line as described further above and forward-facing sensors may detect approach to the beginning of the charge pad(s) and may signal the charge-receiving receptacle to prepare for wireless charge. In another implementation, contacts may be provided and presented beneath the pod battery that make physical contact with the charge pad(s). A charge pad or charge rail may be linear and of a prescribed length to enable a full charge in a single pass.

Charging stations may be placed spaced apart in a covered region whereby a fully charged pod battery may enable distance that exceeds the distance between stations, assuming as well that the pod is not carried by a drone but drives the distance. In a preferred embodiment, charging may be optimized though use of high voltage capacitors, such that a full charge occurs along the charge angle limit (cables) or rail or pad length.

It is apparent that charging cannot be instantaneous, and that relatively quick charging is desirable, as time taken in the charging cycle is time when transport is delayed. In one embodiment of the invention, referring to both FIGS. 21 and 22, high-energy capacitors, referred to often as ultra-capacitors or super capacitors, are incorporated both in the charging station and in the battery systems of the pods, and other devices to be charged in operation of the overall system. Such capacitors are capable of quickly transferring large quanta of energy at high voltage (to keep amperage requirements low).

In FIGS. 20 and 21, ultra-capacitors 2106 are illustrated as a part of both the charging station 2101 and 2102, and also of the pods 1608, in this example. In the charging process in one embodiment, using ultra-capacitors, the primary power source in the charging bay, either 2100 or 2200, charges the ultra-capacitor 2106 in that charging bay, between instances of charging pods or carriers. When the carrier or carrier train engages with the charging bay, the ultra-capacitor 2106 in the charging bay charges the ultra-capacitors in the pods or carriers as they pass. After leaving the charging bay the energy imparted to the ultra-capacitors is used to charge the batteries of the pods or carriers, which is slower process than passing energy between the ultra-capacitors. Ultra-capacitors may also be incorporated in charging drones.

Figure 22:
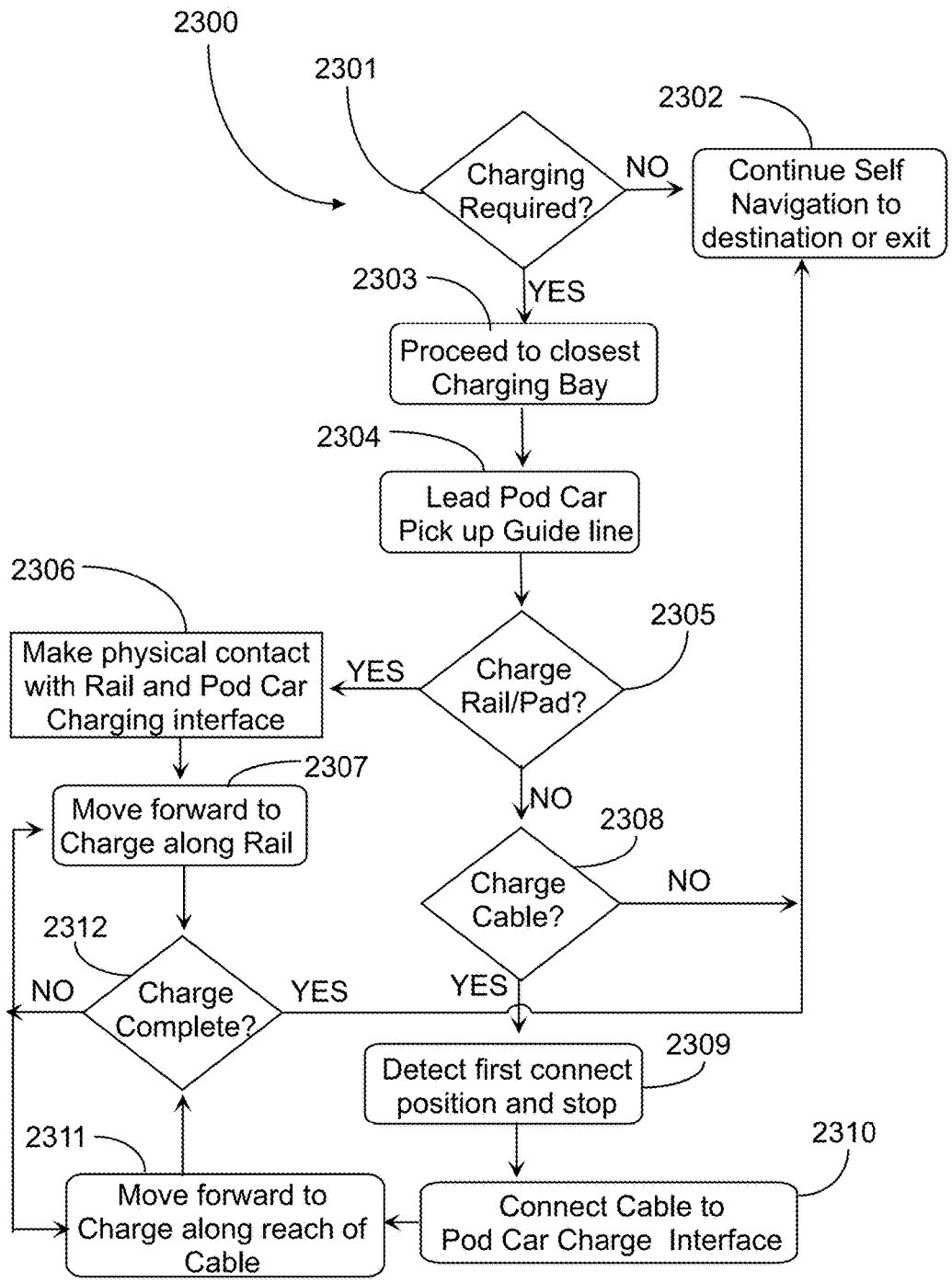
FIG. 22 is a process flow chart depicting steps for charging a pod battery according to at least one embodiment.

FIG. 22 is a process flow chart depicting steps for charging a pod battery according to at least one embodiment. At step 2301 a determination may be made whether a pod car requires charging. Indication of a requirement for charging may be communicated from a pod car to a remote navigation control network entity that subsequently provides navigation instruction to the pod car. In one embodiment, location of and subsequent navigation to a charging bay may be a function of the pod, wherein self-piloting to the charge location is automatic or scheduled in with other tasks or navigated destinations if the pod indicates a need to charge.

In the case of a train of linked pods, it may be that one or a few of the total linked pods require charging, while other pods linked together in the train do not. If a determination is made that charging is not required for a pod at step 2301, the process may move to step 2302, and that pod may continue self-navigation or commanded navigation toward a planned destination or an exit.

If it is determined that a pod requires charging at step 2301 (confirmation), that pod may proceed to a nearest charging bay at step 2303. If it is determined that one or more pods in a train of pods requires charging at step 2301, then all the linked pods may be subjected to entering the pod charging bay, so that the pods requiring charging may be charged without requiring de-latching from the train.

At step 2304 a pod car requiring charging or a lead pod car in a train of pod cars, where one or more of the pod cars requires charging, may detect a charge line in the road or pathway with forward and side presenting sensors, and may steer along the charge line and reduce speed to a preset charging speed.

At step 2305 a determination may be made whether the charge facility uses a fixed charge rail or fixed charging pad running adjacent and parallel to the charge line. If it is determined that the charging facility uses a fixed rail or charge pad(s) in step 2305, the pod or pod train may align to the charge line and make physical contact with a fixed rail and pod charging interface (terminal contact), to initiate charging at step 2306. In the case of a linear charge pad(s) the interface for charging on the pod or pod train may be wireless or a physical contact and the pod or train may follow the charge line adjacent to the linear pad or pads in step 2306.

At step 2307 in the case of a rail or charge pad (s), the pod or pod train may move forward making sliding contact along the rail or linear pad or wireless contact along the linear pad.

The pod or pod train will slow down to charge speed so that fast charging may be accomplished along the length of the rail or linear charge pad (s).

At step 2305 it may be determined that the charging facility does not include a rail or linear charging pad (s). If it is determined that no rail or pad is available a determination is made at step 2308 whether the facility is equipped with a mechanized charging cable or charging cables. If it is determined at step 2308 that the facility is not equipped with rail pads or cables, then the charging process may not be performed at that facility and the pod car or pod train may continue self-navigation to a destination or exit. It may be that the facility is not in use at the time or down for maintenance, etc. A possible next destination may be to a next nearest charging station. It will be apparent to one with skill in the art that a single pod car may have more than one contact type for more than one type of charging apparatus that may be available. It may also be apparent that only one type of facility may be available requiring only a single and standardized contact type on a pod battery for charging.

If it is determined that the facility uses a charging cable or cables at step 2308, the lead pod car (train) or single pod car may detect a first cable contact position and may stop momentarily at step 2309 allowing the mechanized cable to connect to the charge receptacle through a relief opening the pod door at step 2310. Once connected, the pod may proceed forward at a prescribed charging speed while the cable is connected until the cable again reaches maximum extension at the end of the charge zone and detaches from the charging interface at step 2311.

In the case of a train of three pods, a second and a third cable may be employed to charge the following pods if charging is required for those pods as well. When the first cable detaches after a lead pod is finished charging, it may position itself to connect to another pod in a train of pods that reaches the start angle position of the cable at maximum extension length of the cable. In one embodiment the connection is a magnetic connection.

In one embodiment, the connection is a quick-connect and quick-release mechanical connection. In one embodiment the lead pod is not required to stop for the cable to connect if the speed is slow enough for allowing the contact connection to be established. At step 2312 a determination may be made as to whether charging is complete for the single pod or for any pod in a train of pods. In all cases, if it is determined that charging is not complete on a first pass, a single pod or train of pods may navigate to take another charging pass along the rail, pad(s), or along the cable reach at steps 2307 and 2312, depending on type of charge facility. At step 2312, if charging is determined to be complete the process may move to step 2302 to continue self-piloting to a destination or an exit.

In one embodiment any pods in a train that do not require charging may disable or otherwise override a charging receptacle contact apparatus, so that charging does not occur for that pod battery, and so dissipation of current charge in the pod battery does not occur. In one embodiment drones have a separate charge routing and facility dedicated to charging drone batteries. In one implementation a drone may also receive charge through a pod battery charge station if charge lines are routed through the latch mechanisms to a drone battery. For example, the drone battery may receive a charge if the pod battery is fully charged and the pod car or train is still in contact with the charging apparatus.

In one embodiment, chassis battery charging may also be performed if charge lines are routed through the internal latches connecting the pod to the chassis. A drone battery and a chassis battery may be assigned priority such that, first the pod battery is fully charged and then the drone battery and then the chassis battery is charged. In other embodiments separate facilities might be maintained for the three dedicated battery types, whereas a drone will fly to a charging station dedicated for drone charging and a chassis may drive to a charging station dedicated for chassis battery charging.

At risk of redundancy, the following paragraphs summarize material described in an enabling manner above, with reference to the several drawing figures, that the inventor considers to be new, not obvious, and patentable subject matter.

In a broad sense the inventor is providing a transport system, which has a wheeled, steerable, self-powered, self-navigating carrier vehicle, that exhibits a substantially planar support frame, an on-board, rechargeable, battery-based power system, control circuitry, including GPS circuitry, on-board the carrier vehicle, adapted to drive and steer the carrier vehicle, and an upward-facing carrier interface adapted to the support frame, the carrier interface having first physical engagement elements. There is in the system, additionally, a passenger pod adapted to carry both packages and persons, the passenger pod having a structural framework, a rechargeable, battery-based power system, and a downward-facing pod interface adapted to the structural framework, the carrier interface having second physical engagement elements. In implementations of the transport system, the passenger pod, placed upon the carrier vehicle, engages the downward-facing pod interface to the upward-facing carrier interface by the first and second physical engagement elements.

From the just-described transport system, other versions have additional elements and functions, such as, for example, in which the control circuitry comprises wireless communication circuitry, enabling navigation and loading and unloading pods to and from carrier vehicles to be remotely-controlled. Another addition to the system described has the pod interface and the carrier interface each having electrical and electronic engagement ports that engage and disengage when a pod is engaged and disengaged from a carrier vehicle, enabling carrier power and control signals from the pod.

Another version has physical controls accessible by a passenger in the passenger pod, enabling the passenger to navigate the carrier vehicle with the pod supported and engaged. And still another version has additionally an upward-facing physical attachment interface as a part of the passenger pod, the upward-facing physical attachment interface compatible with a downward-facing physical attachment interface on a drone, enabling the passenger pod to be carried by the drone, to be deposited by the drone on the carrier vehicle, and to be picked up by the drone from the carrier vehicle.

Further to the above, in describing different versions of the transport system provided, the carrier vehicle may be configured to carry a passenger pod carrying a single passenger. In another version the carrier vehicle has fore and aft-facing latches, enabling carrier vehicles to be joined end-to-end, and to be navigated as a single vehicle. In still another version four carrier vehicles may be joined in a column, enabling four single-passenger pods to be placed and carried on the joined carrier vehicles, which is enabled to be navigated as a single carrier vehicle.

In still another version of the transport system, the carrier vehicle has fore and aft-facing latches, and left and right-facing latches, enabling carrier vehicles to be joined in rows and columns to carry passenger pods placed on the joined carrier vehicles in the rows and columns. IN another innovation, carrier vehicles may be joined by the fore and aft-facing latches and by the left and right-facing latches, forming a 2 by 4 array of carriers, enabling placement and transport of a single passenger pod on each of the joined carrier vehicles. And in yet another version, the carrier vehicle's substantially planar support frame is sized and enabled to carry four single-passenger pods in a row, with one set of wheels fore and aft.

In yet another somewhat different version of the transport system, the carrier vehicle's substantially planar support frame is sized and enabled to carry eight single-passenger pods in two columns, four pods per column, with one set of wheels fore and aft. In another, the passenger pod is a four-person pod, and the carrier vehicle carries one four-person pod. In yet another, the passenger pod is an eight-person pod in two columns and four rows, and the and the carrier vehicle carries one eight-person pod.

Finally, facility for charging batteries of passenger pods and carrier vehicles is made by providing charging stations. In one version, the transport system has a charging station for charging batteries of pods and carriers, the charging station having a power supply and a conductor element enabled to connect to charging circuitry in passenger pods or carrier vehicles, as the carrier vehicles and pods pass the charging station, power being transferred from the charging station to the batteries in the pods or carrier vehicles. In one version with a charging station, the conductor element comprises a cable connected to the charging station, and controllable to connect to a charging port on a carrier vehicle or a passenger pod, and to stay connected while the carrier vehicle or passenger pod moves by the charging station. In another the conductor element comprises a rail presented along a direction of travel of a passenger pod or carrier vehicle, and the passenger pod or carrier vehicle comprises a sliding contact element enabled to contact and slide along the rail while passing the charging station, power being transferred from the charging station through the rail and the sliding element to a battery of the carrier vehicle or passenger pod.

In either version of charging stations and operation, there may be a first ultra-capacitor in the charging station, and a second ultra-capacitor in charging circuitry of a passenger pod or a carrier vehicle, and wherein the charging station charges the first ultra-capacitor between charging cycles involving passenger pods or carrier vehicles, and during a charging cycle, the first ultra-capacitor charges the second ultra-capacitor, and the second ultra-capacitor charges the passenger pod or carrier vehicle battery after leaving the charging station.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:

1. A transport system, comprising:
a wheeled, steerable, carrier vehicle, having an on-board, rechargeable, battery-based power system powering electrical motors adapted to drive the wheels, carrier control circuitry, including GPS circuitry, on-board the carrier vehicle, adapted to drive and steer the carrier vehicle, and an upward-facing carrier interface, the carrier interface having first physical engagement elements and first electrical connector elements; and
a passenger pod having a structural framework, a power system comprising a rechargeable pod battery having electrical capacity to drive the carrier vehicle, and a downward-facing pod interface, the pod interface having second physical engagement elements, and second electrical connector elements;
wherein the passenger pod, placed upon the carrier vehicle, engages the downward-facing pod interface to the upward-facing carrier interface by the first and second physical engagement elements, and engages the first and second electrical connector elements, and wherein, with the passenger pod connected to and carried by the carrier vehicle, the pod battery powers the carrier vehicle, supplying power through the first and second connector elements to the electric motors of the carrier vehicle.

2. The transport system of claim 1, wherein the control circuitry comprises wireless communication circuitry, enabling navigation and loading and unloading pods to and from carrier vehicles to be remotely-controlled.

3. The transport system of claim 1 further comprising physical controls accessible by the passenger, wherein the pod interface and the carrier interface each have electronic engagement ports that engage and disengage when a pod is engaged and disengaged from a carrier vehicle, enabling a passenger in the pod to drive and steer the carrier vehicle.

4. The transport system of claim 1 further comprising an upward-facing physical attachment interface as a part of the passenger pod, the upward-facing physical attachment interface compatible with a downward-facing physical attachment interface on a drone, enabling the passenger pod to be carried by the drone, to be deposited by the drone on the carrier vehicle, and to be picked up by the drone from the carrier vehicle.

5. The transport system of claim 1 wherein the carrier vehicle is configured to carry a passenger pod carrying a single passenger.

6. The transport system of claim 1 wherein the carrier vehicle has fore and aft-facing latches, enabling carrier vehicles to be joined end-to-end, and to be navigated as a single vehicle.

7. The transport system of claim 6 wherein four carrier vehicles are joined in a column, enabling four single-passenger pods to be placed and carried on the joined column of carrier vehicles, which is enabled to be navigated as a single carrier vehicle.

8. The transport system of claim 1 wherein the carrier vehicle has fore and aft-facing latches, and left and right-facing latches, enabling carrier vehicles to be joined in columns and rows to carry passenger pods placed on the joined carrier vehicles in the columns and rows.

9. The transport system of claim 8 wherein carrier vehicles are joined by the fore and aft-facing latches and by the left and right-facing latches, forming a 2 by 4 array of carriers, enabling placement and transport of a single passenger pod on each of the joined carrier vehicles.

10. The transport system of claim 1 wherein the carrier vehicle's substantially planar support frame is sized and enabled to carry four single-passenger pods in a column, with one set of wheels fore and aft.

11. The transport system of claim 1 wherein the carrier vehicle's substantially planar support frame is sized and enabled to carry eight single-passenger pods in two columns, four pods per column, with one set of wheels fore and aft.

12. The transport system of claim 10 wherein the passenger pod is a four-person pod, and the carrier vehicle carries one four-person pod.

13. The transport system of claim 11 wherein the pod is an eight-person pod in two columns and four rows, and the carrier vehicle carries one eight-person pod.

14. The transport system of claim 1 further comprising a charging station for charging batteries of pods and carriers, the charging station having a power supply and a conductor element enabled to connect to charging circuitry in passenger pods or carrier vehicles, as the carrier vehicles and pods pass the charging station, power being transferred from the charging station to the batteries in the pods or carrier vehicles.

15. The transport system of claim 14 wherein the conductor element comprises a cable connected to the charging station, and controllable to connect to a charging port on a carrier vehicle or a passenger pod, and to stay connected while the carrier vehicle or passenger pod moves by the charging station.

16. The transport system of claim 14 wherein the conductor element comprises a rail presented along a direction of travel of a passenger pod or carrier vehicle, and the passenger pod or carrier vehicle comprises a sliding contact element enabled to contact and slide along the rail while passing the charging station, power being transferred from the charging station through the rail and the sliding element to a battery of the carrier vehicle or passenger pod.

17. The transport system of claim 14 further comprising a first ultra-capacitor in the charging station, and a second ultra-capacitor in charging circuitry of a passenger pod or a carrier vehicle, and wherein the charging station charges the first ultra-capacitor between charging cycles involving passenger pods or carrier vehicles, and during a charging cycle, the first ultra-capacitor charges the second ultra-capacitor, and the second ultra-capacitor charges the passenger pod or carrier vehicle battery after leaving the charging station.

* * * * *